(12) United States Patent
Miyasaka et al.

(10) Patent No.: US 10,467,511 B2
(45) Date of Patent: Nov. 5, 2019

(54) RECORDING APPARATUS WITH A REAR FEEDING UNIT AND A MEDIUM REVERSING UNIT

(71) Applicant: SEIKO EPSON CORPORATION, Tokyo (JP)

(72) Inventors: Haruki Miyasaka, Shiojiri (JP); Narihiro Oki, Matsumoto (JP); Shinji Kanemaru, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/902,866

(22) Filed: Feb. 22, 2018

(65) Prior Publication Data

US 2018/0239996 A1  Aug. 23, 2018

(30) Foreign Application Priority Data

Feb. 23, 2017  (JP) ................................. 2017-032257
Aug. 8, 2017   (JP) ................................. 2017-153363

(51) Int. Cl.

| | |
|---|---|
| *G06K 15/16* | (2006.01) |
| *B65H 5/06* | (2006.01) |
| *H04N 1/12* | (2006.01) |
| *H04N 1/00* | (2006.01) |
| *B65H 85/00* | (2006.01) |
| *B65H 3/06* | (2006.01) |

(Continued)

(52) U.S. Cl.
CPC ........... *G06K 15/16* (2013.01); *B65H 3/0607* (2013.01); *B65H 3/5215* (2013.01); *B65H 3/565* (2013.01); *B65H 5/06* (2013.01); *B65H 5/062* (2013.01); *B65H 85/00* (2013.01); *H04N 1/00602* (2013.01); *H04N 1/121* (2013.01); *B65H 2402/32* (2013.01); *B65H 2402/441* (2013.01); *B65H 2402/46* (2013.01); *B65H 2404/142* (2013.01); *B65H 2404/144* (2013.01); *B65H 2404/1531* (2013.01); *B65H 2404/6111* (2013.01); *B65H 2601/523* (2013.01); *B65H 2801/12* (2013.01)

(58) Field of Classification Search
CPC ........ G06K 15/16; B65H 5/062; B65H 3/565; B65H 85/00; B65H 3/5215; B65H 3/0607; B65H 5/06; B65H 2801/12; B65H 2601/523; B65H 2402/32; B65H 2402/46; B65H 2404/142; B65H 2404/6111; B65H 2404/144; B65H 2404/1531; B65H 2402/441; H04N 1/121; H04N 1/00602
See application file for complete search history.

(56) References Cited

FOREIGN PATENT DOCUMENTS

| | | | |
|---|---|---|---|
| JP | 2008-297128 A | | 12/2008 |
| JP | 2008297128 A | * | 12/2008 |
| JP | 2009-184801 A | | 8/2009 |

* cited by examiner

*Primary Examiner* — Bradley W Thies
(74) *Attorney, Agent, or Firm* — Workman Nydegger

(57) ABSTRACT

A recording apparatus includes a feeding roller, a rear feeding unit being provided on a rear side of the apparatus, and a medium reversing unit provided below a medium support section and including a reversing roller. At least a part of a rear side of the rear feeding unit forms a medium transport path in which the medium is transported by the reversing roller, the rear feeding unit includes a driven roller configured to nip the medium with the reversing roller therebetween, and at least a part of the driven roller is located in a roller accommodating space formed on a rear side of the medium support section.

14 Claims, 18 Drawing Sheets

(51) Int. Cl.
*B65H 3/52* (2006.01)
*B65H 3/56* (2006.01)

FIG. 13
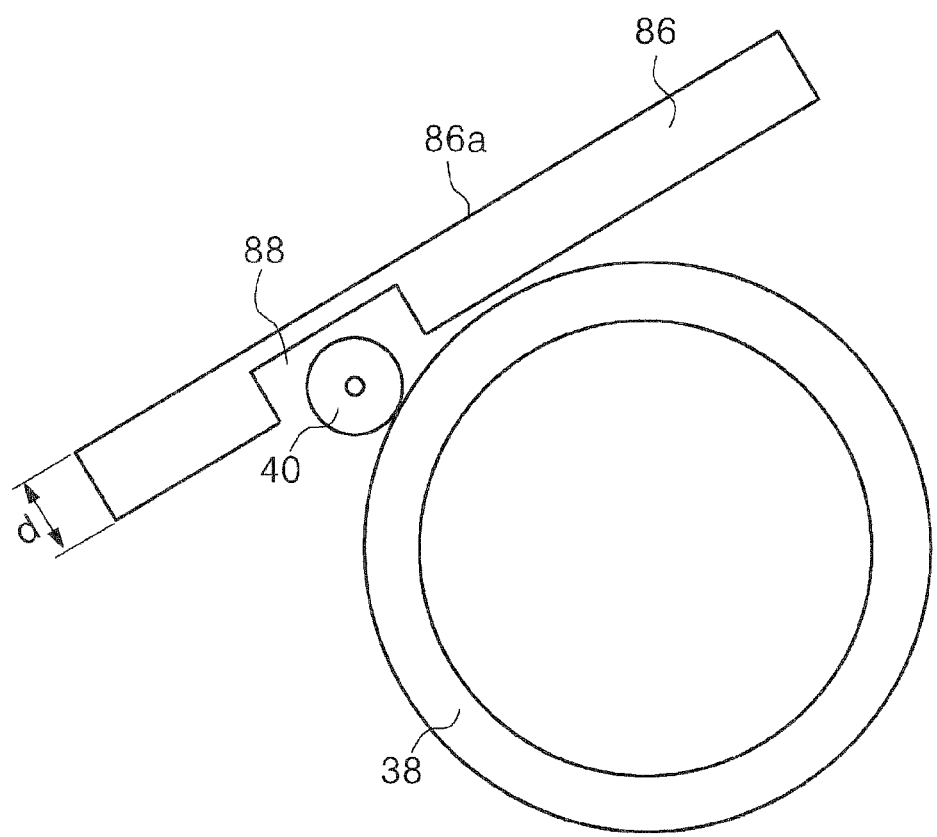
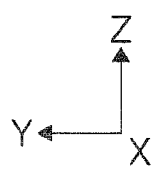

RECORDING APPARATUS WITH A REAR FEEDING UNIT AND A MEDIUM REVERSING UNIT

BACKGROUND

1. Technical Field

The present invention relates to a recording apparatus for performing recording onto a medium.

2. Related Art

Recording apparatuses such as facsimile machines and printers include some recording apparatuses that are provided with a path that serves as both a U-turn path for one-sided recording and a U-turn path for two-sided recording, for example, as described in JP-A-2009-184801. Some other recording apparatuses are provided with a reverse transport path for reversing a sheet to perform recording on both sides, for example, as in JP-A-2008-297128. The reverse transport path is provided on the rear side of a sheet supplying device that supports the sheet in a backward-tilted orientation. The sheet that has been supplied by the sheet supplying device and on which recording has been performed is transported to the reverse transport path. In the reverse transport path, the sheet is reversed and recording is performed onto the sheet.

Another recording apparatus includes, as sheet feeding paths, for example, two sheet feeding paths. Specifically, a recording apparatus includes a sheet feeding path for feeding a sheet from a sheet cassette that is provided in the apparatus bottom section and a sheet feeding path to which a recording sheet is supplied from the back side of the apparatus in a slanting direction. The recording apparatus described in JP-A-2009-184801 is an example of such a recording apparatus. These recording apparatuses tend to be large and further reduction in size has been demanded.

SUMMARY

An advantage of some aspects of the invention is that there is provided a size-reduced recording apparatus that includes a rear feeding unit having a medium support section configured to support a medium in an inclined orientation and a medium reversing unit configured to reverse the medium.

A recording apparatus according to an aspect of the invention for solving the above-mentioned problems includes a feeding roller configured to feed a medium, a rear feeding unit including a medium support section configured to support the medium in an inclined orientation and to be switched between a first state in which the supported medium is pressed against the feeding roller and a second state in which the supported medium is separated from the feeding roller, the rear feeding unit being provided on a rear side of the apparatus, and a medium reversing unit provided below the medium support section, the medium reversing unit including a reversing roller configured to reverse the medium. At least a part of a rear side of the rear feeding unit forms a medium transport path in which the medium is transported by the reversing roller, the rear feeding unit includes a driven roller configured to nip the medium with the reversing roller therebetween, and at least a part of the driven roller is located in a roller accommodating space formed on a rear side of the medium support section when the medium support section is in the second state.

According to this aspect, the rear feeding unit includes the driven roller configured to nip the medium with the reversing roller therebetween. At least a part of the driven roller is located in the roller accommodating space formed on the rear side of the medium support section when the medium support section is in the second state. Consequently, the rear feeding unit and the medium reversing unit can be closely placed and thereby the size-reduced apparatus can be provided.

It is preferable that the reversing roller and the driven roller be located within an occupied area of the medium support section in the apparatus depth direction. In this case, the reversing roller and the driven roller are located within the occupied area of the medium support section in the apparatus depth direction. Accordingly, the size of the apparatus in the depth direction can be reduced.

It is preferable that the reversing roller and the driven roller overlap at least a part of the medium support section in the apparatus height direction. In this case, the reversing roller and the driven roller overlap at least a part of the medium support section in the apparatus height direction. Accordingly, the size of the apparatus in the height direction can be reduced.

It is preferable that the recording apparatus further include an auxiliary tray configured to support together with the medium support section a medium that is set on the rear feeding unit. The auxiliary tray is switched between a storage state in which the auxiliary tray is stored on the rear side of the apparatus and a usage state in which the auxiliary tray is pulled upward from the storage state to extend a support surface of the medium support section to support the medium, and the reversing roller and the driven roller are located between the auxiliary tray that is in the storage state and the medium support section in the apparatus depth direction. In this case, the reversing roller and the driven roller are located using the space between the medium support section and the auxiliary tray, and thereby the size-reduced apparatus can be provided.

It is preferable that the recording apparatus further include an upstream roller configured to nip the medium with the reversing roller therebetween. The upstream roller is located on the upstream side of the driven roller in the medium transport path in which the medium is transported by the reversing roller. The upstream roller is located within an occupied area of the reversing roller in the apparatus depth direction.

In this case, the recording apparatus further includes the upstream roller configured to nip the medium with the reversing roller therebetween. The upstream roller is located on the upstream side of the driven roller in the medium transport path around the reversing roller. The upstream roller is located within an occupied area of the reversing roller in the apparatus depth direction. Consequently, the size of the apparatus in the depth direction can be reduced.

It is preferable that the rear feeding unit include a separation roller configured to nip and separate the medium with the feeding roller therebetween, a medium return member configured to return the medium separated by the feeding roller and the separation roller, and a cover member located between an area where the medium return member is located and a medium transport path on a downstream side of the reversing roller. The cover member is configured to form the medium transport path on the downstream side of the reversing roller.

In this case, the cover that covers the area where the medium return member is located forms the medium transport path on the downstream side of the reversing roller.

Consequently, the number of components can be reduced and the costs can be reduced.

It is preferable that the rear feeding unit include a roller support member configured to support the separation roller. The roller support member is located between an area where the separation roller is located and the medium transport path on the downstream side of the reversing roller, and the roller support member is configured to cover the area where the separation roller is located and form the medium transport path on the downstream side of the reversing roller.

In this case, the roller support member that supports the separation roller forms the medium transport path on the downstream side of the reversing roller. Consequently, the number of components can be reduced and the costs can be reduced.

It is preferable that the recording apparatus further include a recording section configured to perform recording onto the medium, and a transport section configured to transport the medium toward the recording section. In performing printing on both sides of the medium, recording is performed on the medium that is fed from the medium support section by the recording section, the recorded medium is transported in a direction opposite to the transport direction in the recording and enters the medium reversing unit, and the recorded medium is transported in the transport path formed by a part of the rear side of the rear feeding unit to the transport section.

In this case, a part of the rear side of the rear feeding unit forms the transport path for the medium that passes through the medium reversing unit and is transported to the transport section. Consequently, the number of components can be reduced and the size of the apparatus can be reduced.

It is preferable that the medium on which recording has been performed by the recording section be transported below the roller support member in the direction opposite to the transport direction in printing and enter the medium reversing unit, and be transported again below the roller support member to the transport section.

In this case, the roller support member forms the transport path for the medium that has passed through the medium reversing unit and reversed. Consequently, the number of components can be reduced and the size of the apparatus can be reduced.

According to a second aspect of the invention, a recording apparatus include a recording section configured to perform recording on a medium, a transport section configured to transport the medium toward the recording section, a feeding roller configured to feed the medium toward the transport section, a rear feeding unit including a medium support section configured to support the medium fed by the feeding roller in an inclined orientation, the rear feeding unit being provided on a rear side of the apparatus, and a medium reversing unit provided below the medium support section and includes a medium reversing unit including a curved path configured to bend and reverse the medium. In performing printing on both sides of the medium, recording is performed on the medium that is fed from the medium support section by the recording section, the recorded medium is transported in a direction opposite to the transport direction in the recording and enters the curved path, and the recorded medium is transported in the transport path formed by a part of the rear side of the rear feeding unit to the transport section.

In this case, a part of the rear side of the rear feeding unit forms the transport path for the medium that passes through the medium reversing unit and is transported to the transport section. Consequently, the number of components can be reduced and the size of the apparatus can be reduced.

According to a third aspect of the invention, a recording apparatus include a recording section configured to perform recording on a medium, a transport section configured to transport the medium toward the recording section, a feeding roller configured to feed the medium toward the transport section, a rear feeding unit including a medium support section configured to support the medium fed by the feeding roller in an inclined orientation, the rear feeding unit being provided on a rear side of the apparatus, and a medium reversing unit provided below the medium support section and includes a medium reversing unit including a curved path configured to bend and reverse the medium. The rear feeding unit includes a separation roller configured to nip and separate the medium with the feeding roller therebetween, and a roller support member configured to support the separation roller, and in performing printing on both sides of the medium, recording is performed on the medium that is fed from the medium support section by the recording section, the recorded medium is transported below the roller support member in a direction opposite to the transport direction in the recording and enters the curved path, and the recorded medium is transported again below the roller support section to the transport section.

According to this aspect, the roller support member forms the transport path for the medium that passes through the medium reversing unit and is reversed. Consequently, the number of components can be reduced and the size of the apparatus can be reduced.

It is preferable that in this recording apparatus, a space in which the medium can be bent be provided on the medium transport path between an exit of the curved path and the lower side of the roller support member.

In this case, in this recording apparatus, the space in which the medium can be bent is provided on the medium transport path between the exit of the curved path and the lower side of the roller support member. Accordingly, the medium can be appropriately bent for skew correction on the upstream side of the transport section.

It is preferable that the medium reversing unit be detachably attached to the apparatus body. In this case, the medium reversing unit is detachably attached to the apparatus body and accordingly, when a paper jam occurs, the operation for removing the jam can be readily performed.

BRIEF DESCRIPTION OF THE DRAWINGS

The invention will be described with reference to the accompanying drawings, wherein like numbers reference like elements.

FIG. 13 is a schematic view illustrating a modification of a medium support section.

DESCRIPTION OF EXEMPLARY EMBODIMENTS

Figure 1:
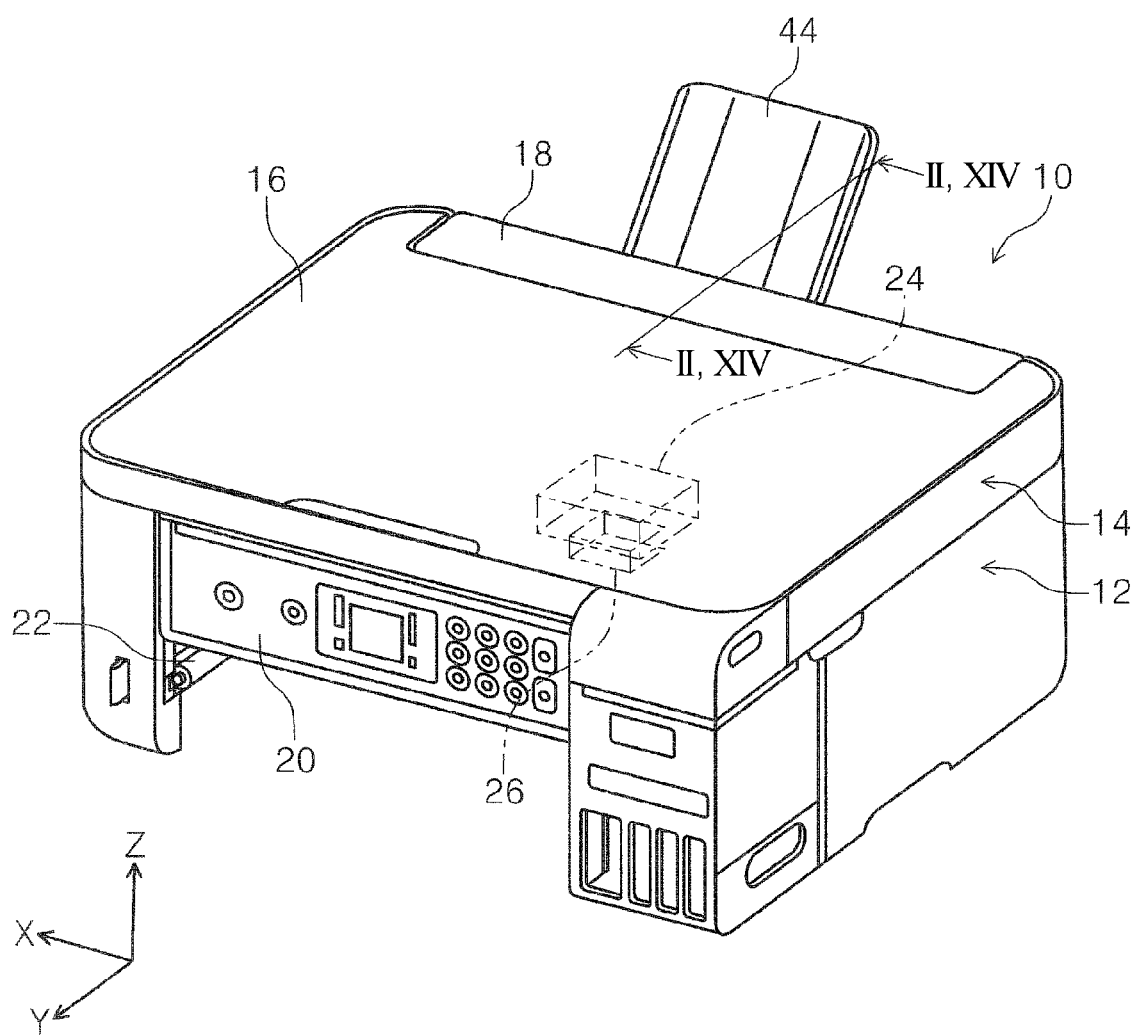
FIG. 1 is an external perspective view of a printer according to an embodiment.

Hereinafter, embodiments of the invention will be described with reference to the attached drawings. In the embodiments described below, to the same components, the same reference numerals are given, and their descriptions will be made only in the first embodiment and will be omitted in the subsequent embodiments.

Figure 2:
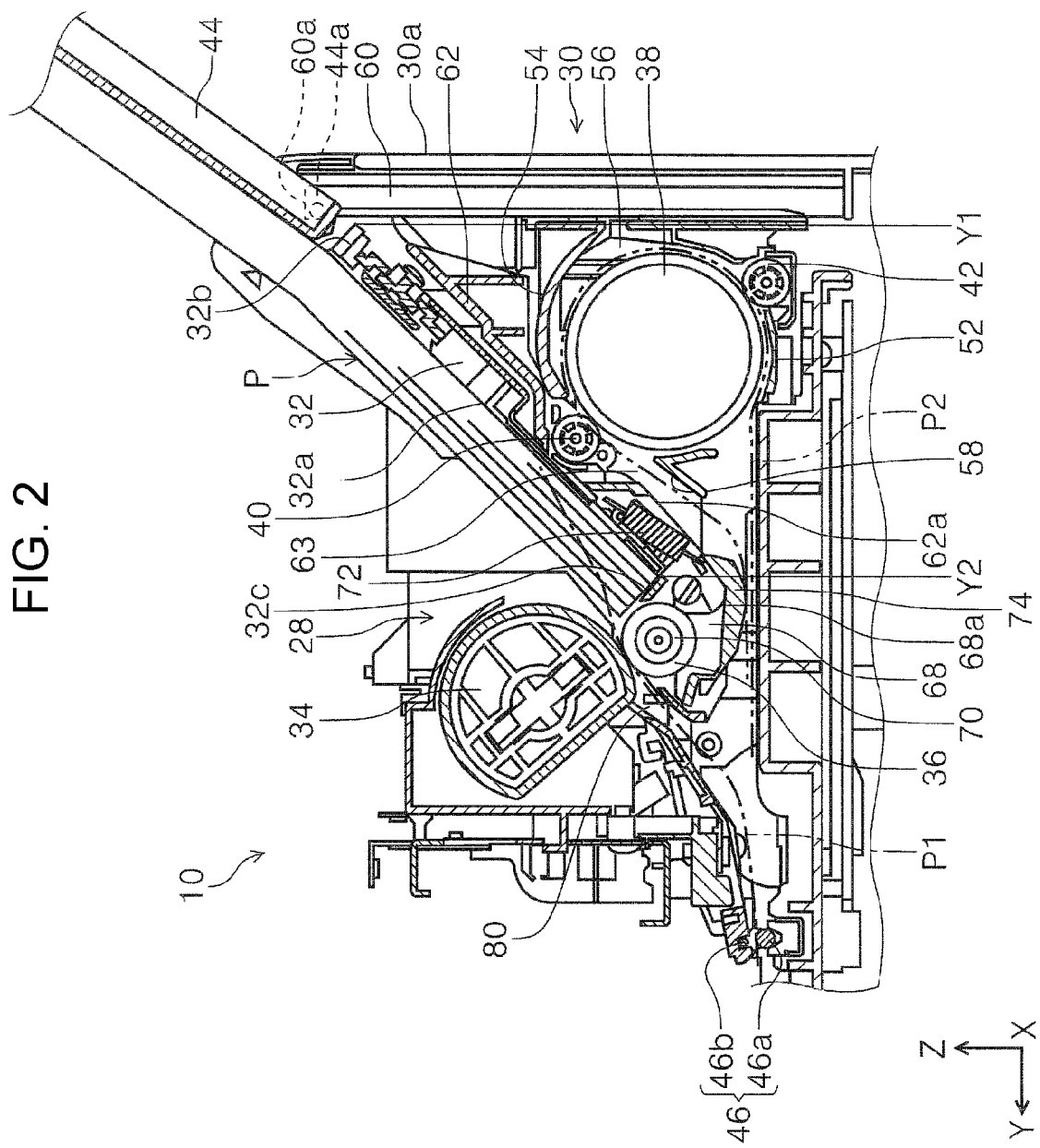
FIG. 2 is a cross-sectional view of a medium support section in a second state taken along the line II-II in FIG. 1.
Figure 3:
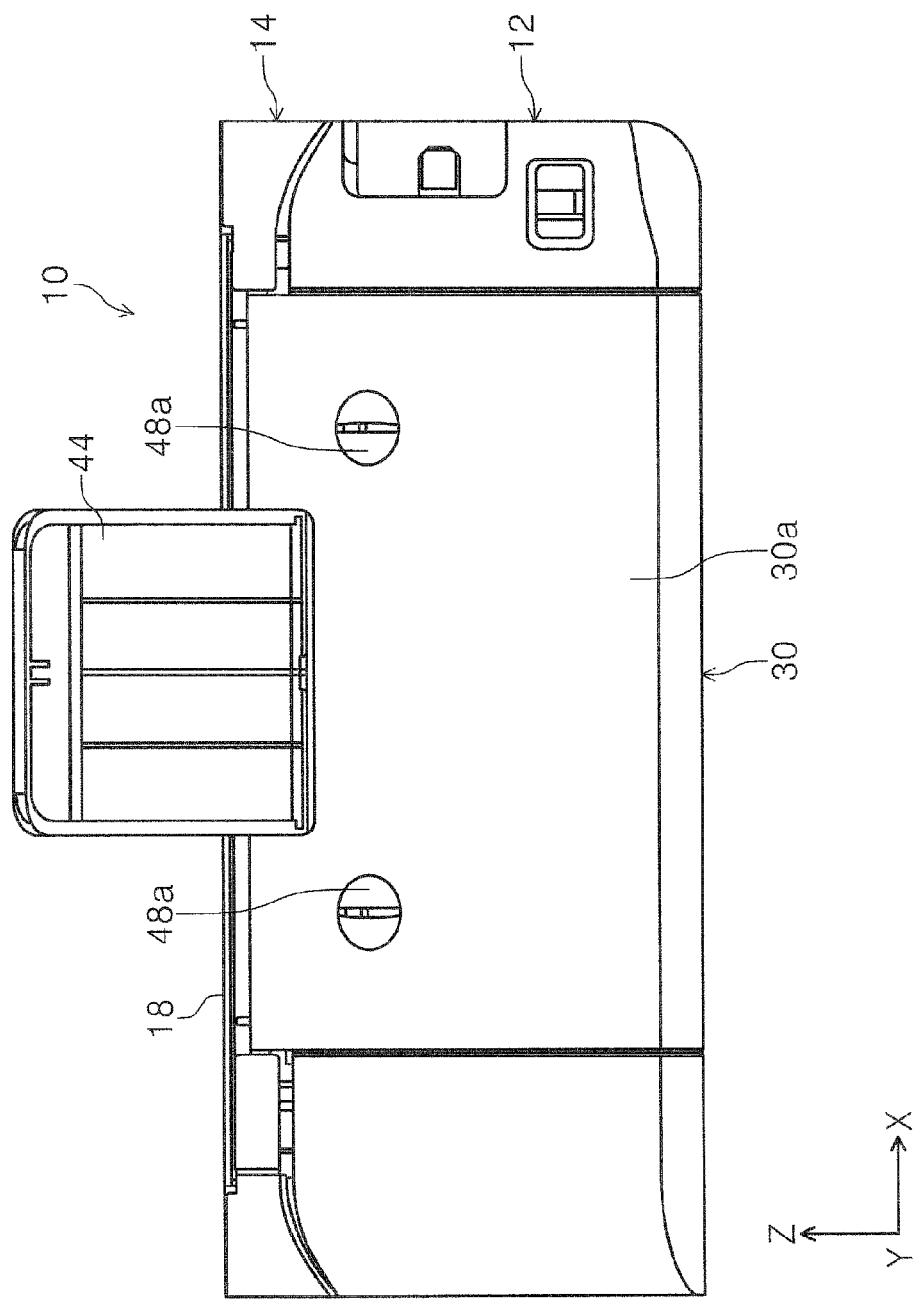
FIG. 3 is a rear view of a printer according to an embodiment.
Figure 4:
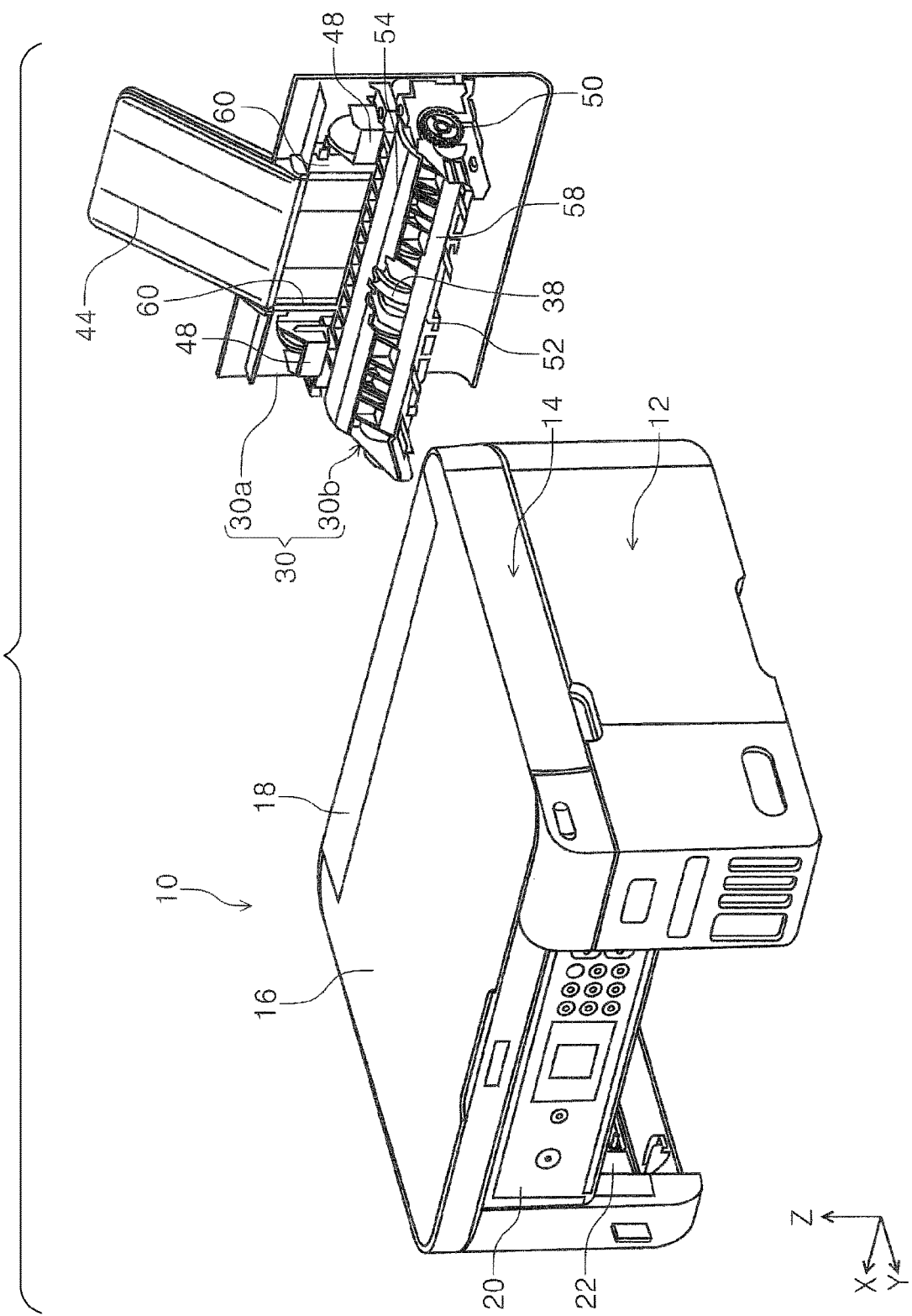
FIG. 4 illustrates a printer from which a medium reversing unit is detached.
Figure 5:
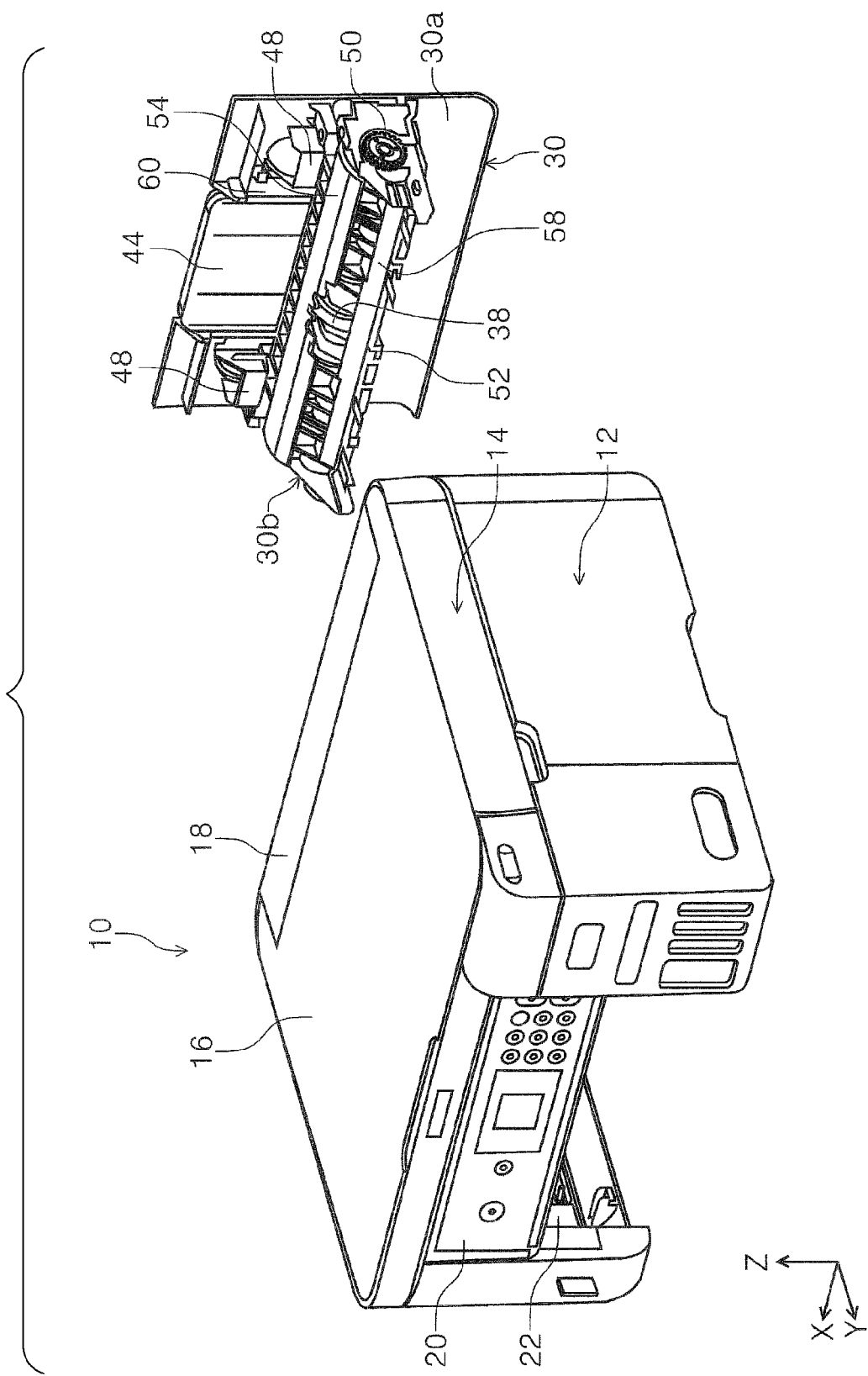
FIG. 5 illustrates a printer from which a medium reversing unit is detached and in which an auxiliary tray is stored.
Figure 6:
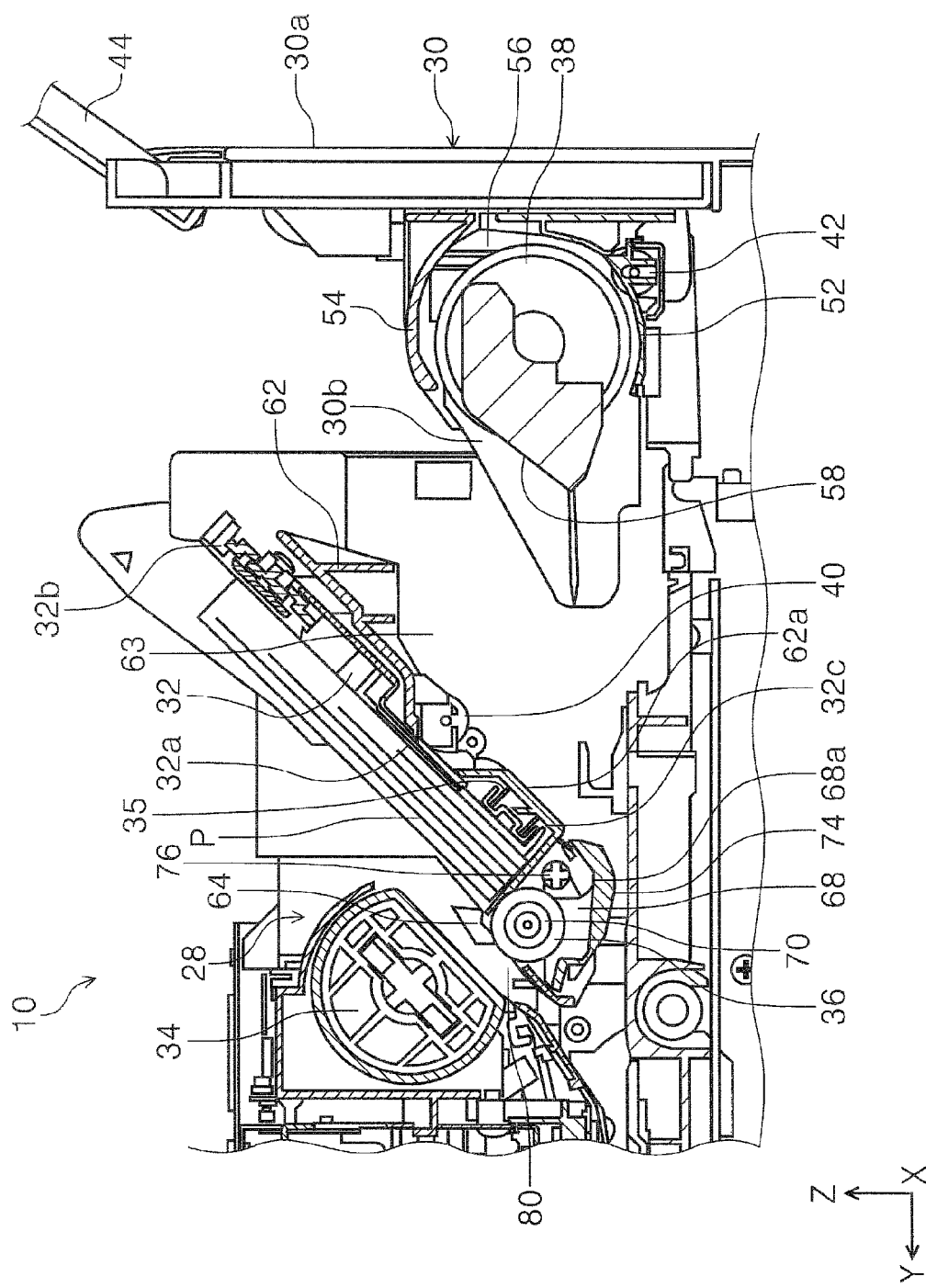
FIG. 6 illustrates a relationship between a rear feeding unit and a medium reversing unit.

FIG. 1 is an external perspective view of a printer according to an embodiment. FIG. 2 is a cross-sectional view of a medium support section in a second state taken along the line II-II in FIG. 1. FIG. 3 is a rear view of the printer according to the embodiment. FIG. 4 illustrates the printer from which a medium reversing unit is detached. FIG. 5 illustrates the printer from which the medium reversing unit is detached and in which an auxiliary tray is stored. FIG. 6 illustrates a relationship between a rear feeding unit and the medium reversing unit.

Figure 7:
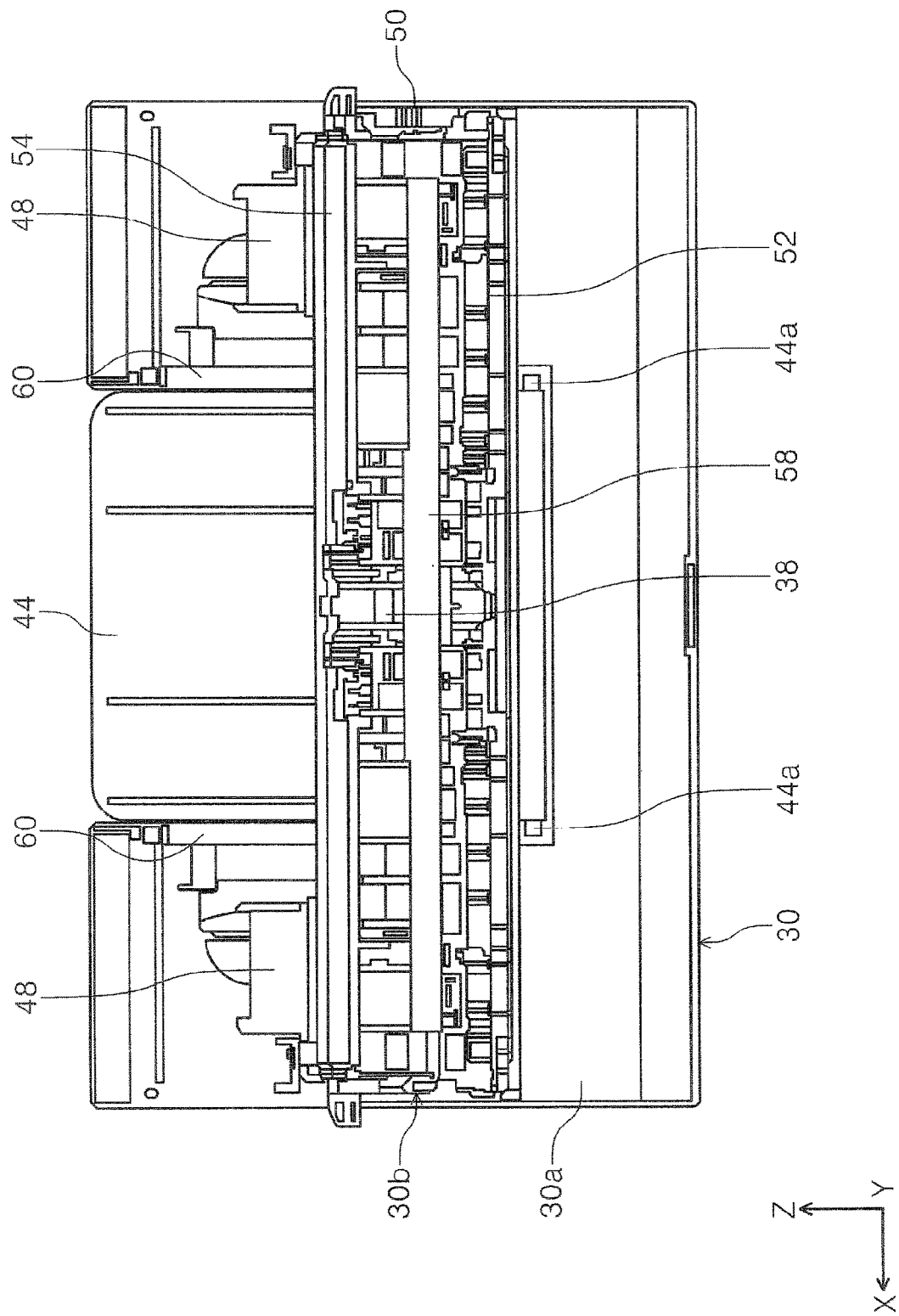
FIG. 7 is a front view of a medium reversing unit.
Figure 8:
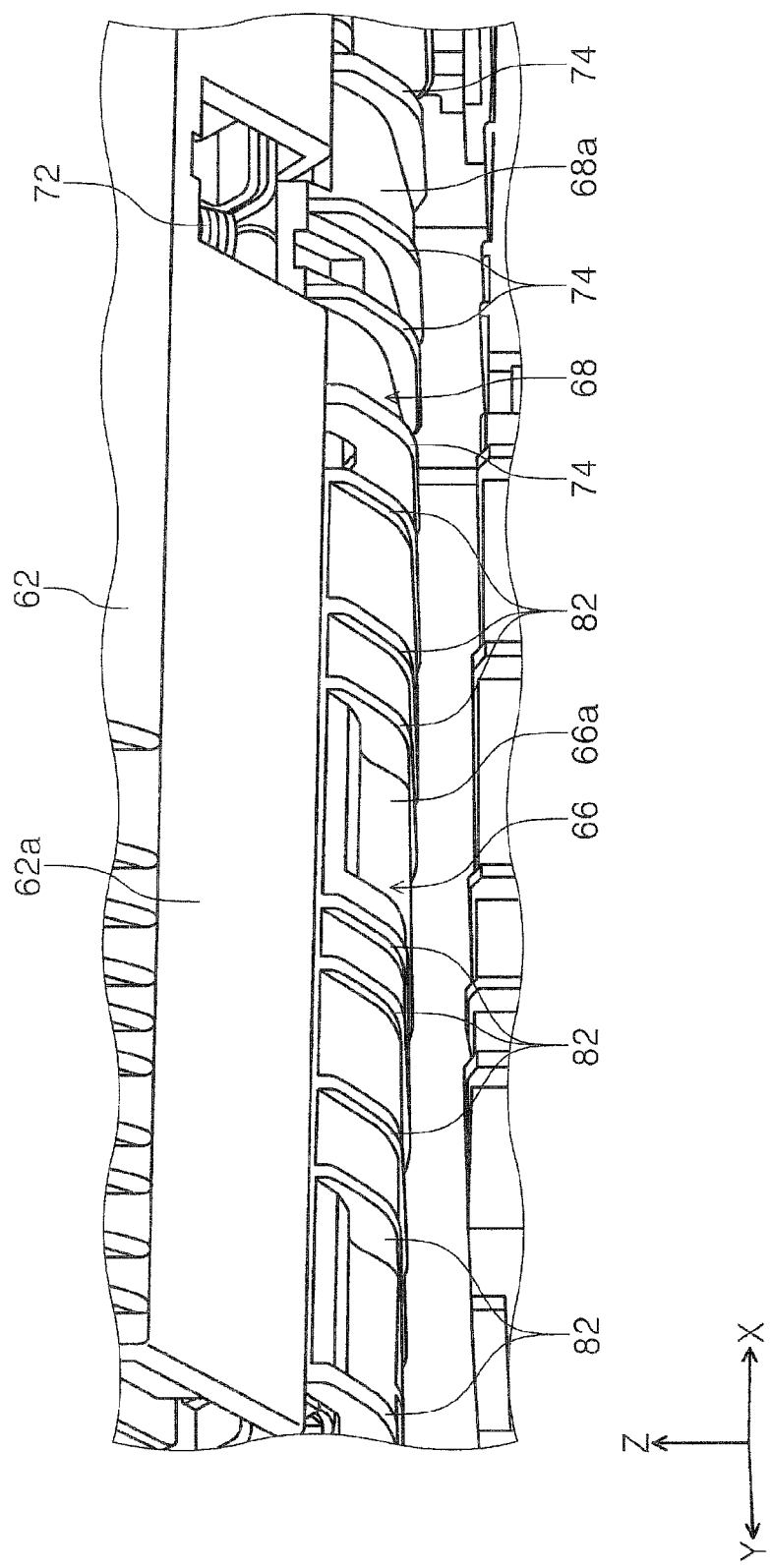
FIG. 8 is a perspective view illustrating a cover member in a rear feeding unit.
Figure 9:
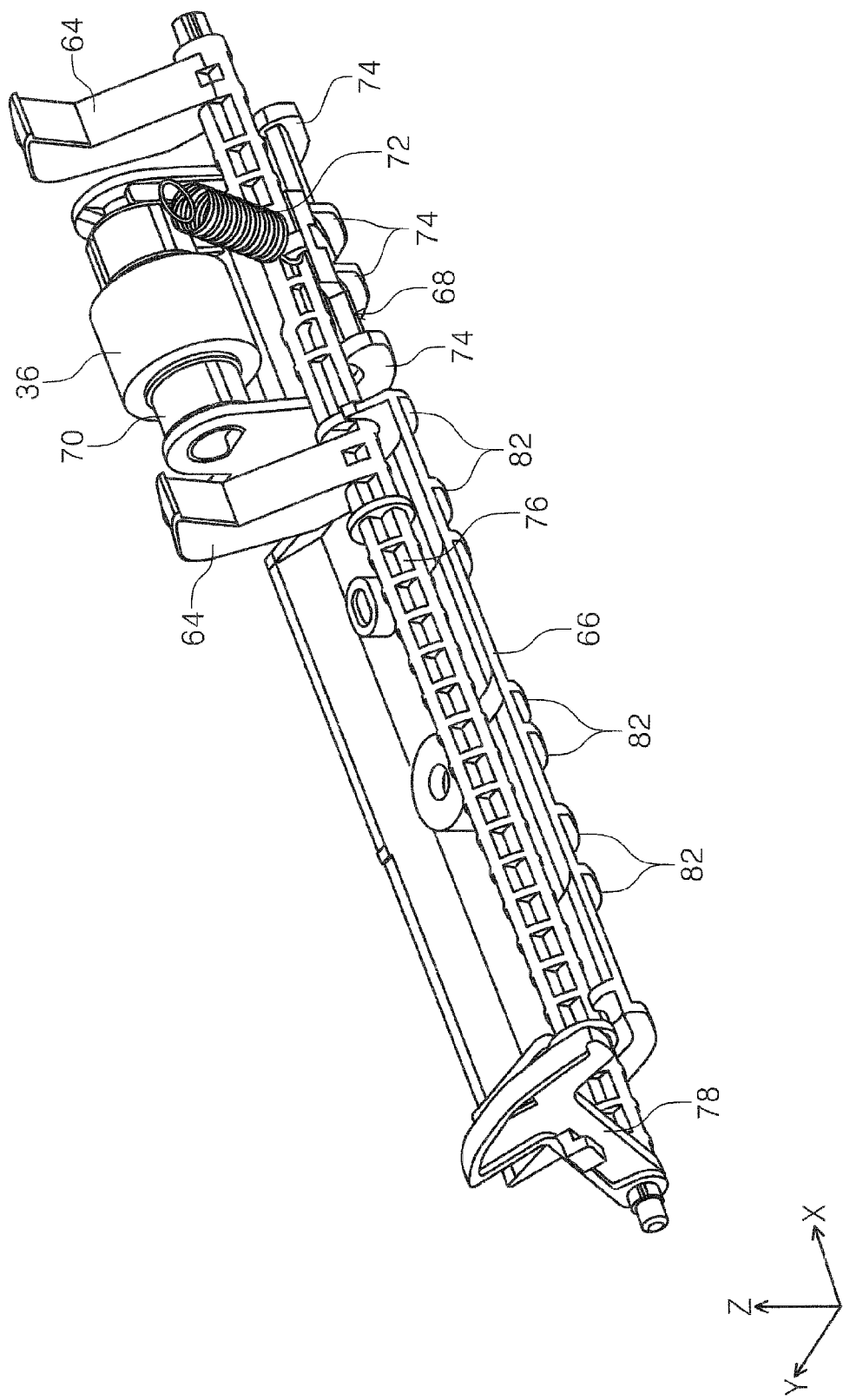
FIG. 9 is a perspective view illustrating a relationship among a separation roller, medium return levers, and a cover member.
Figure 10:
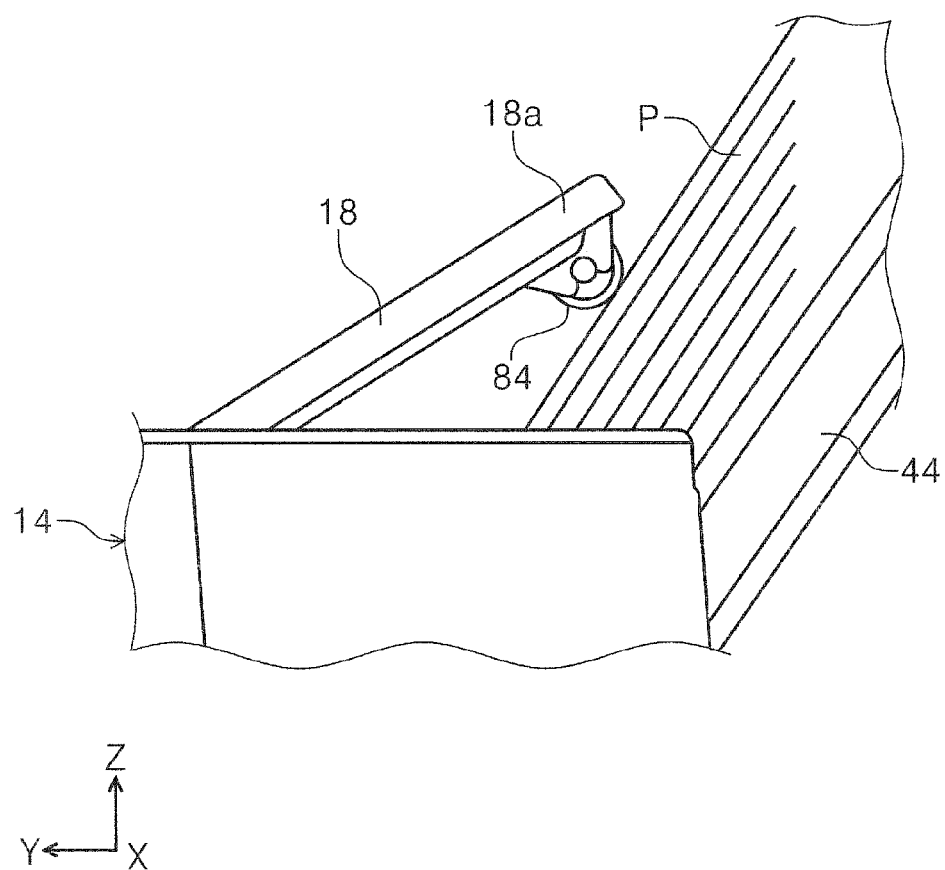
FIG. 10 is a side view illustrating a relationship between a feed port cover that is provided on a rear side of the apparatus and a medium that is supported by a medium support section.
Figure 11:
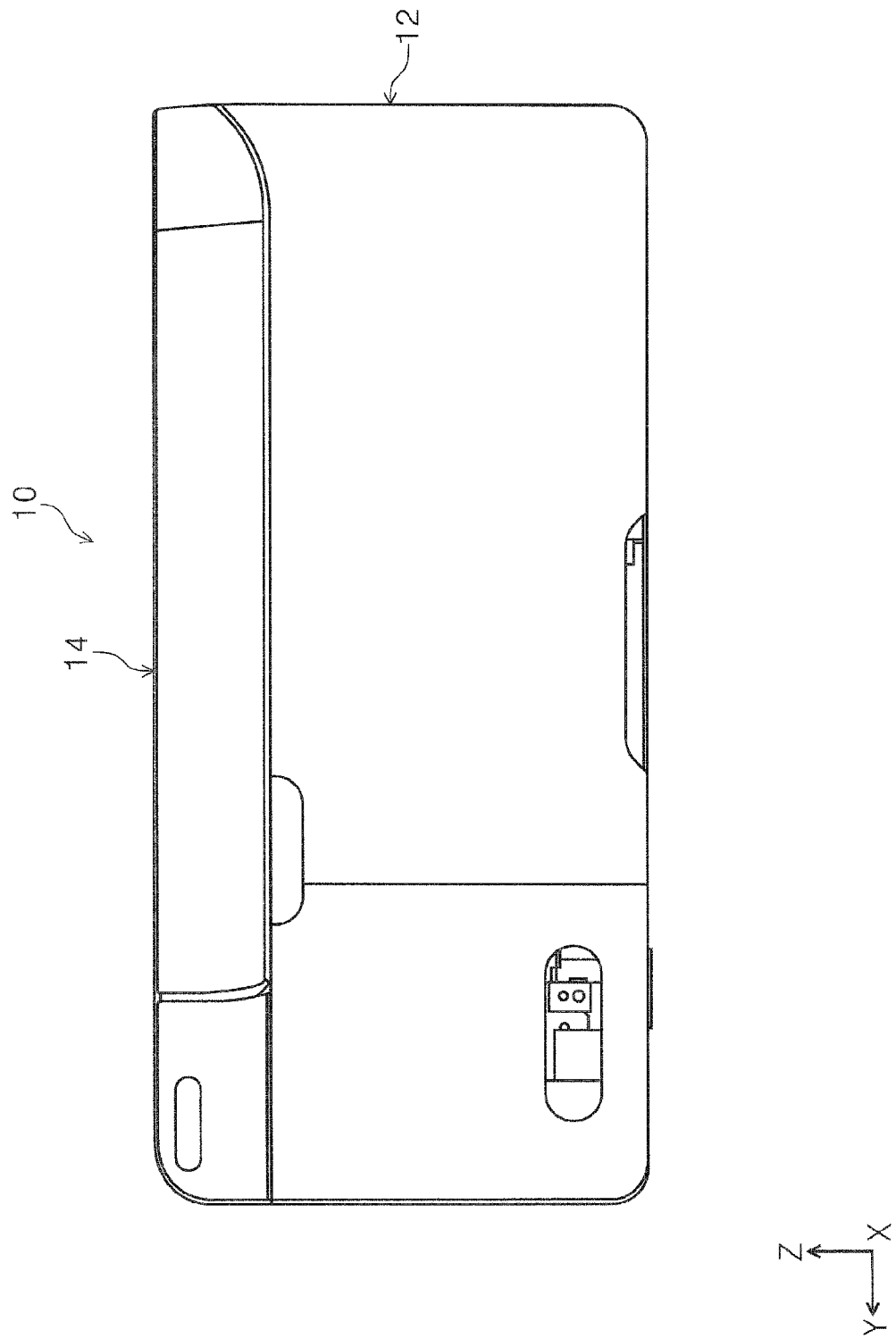
FIG. 11 is a side view of a printer in which an auxiliary tray is stored and a feed port cover is closed.
Figure 12:
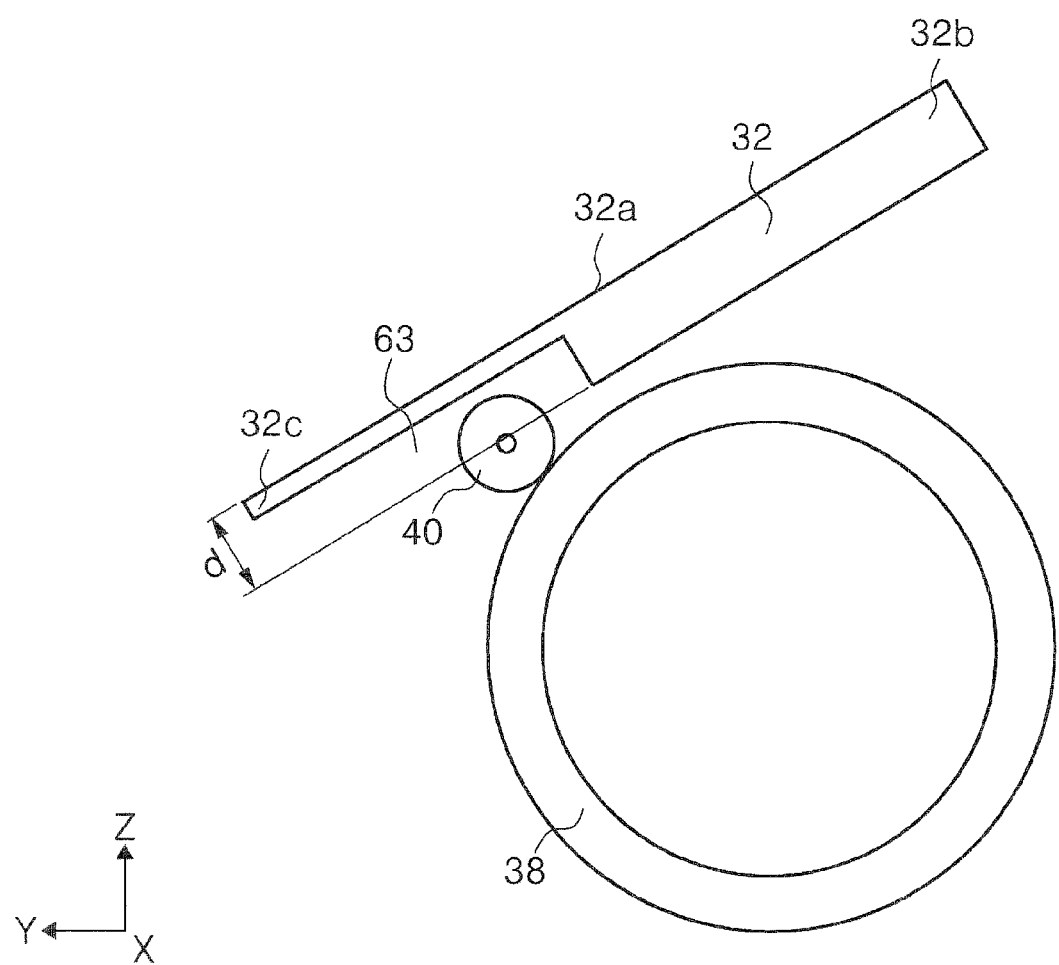
FIG. 12 is a schematic view illustrating a relationship between a medium support section and a driven roller.
Figure 14:
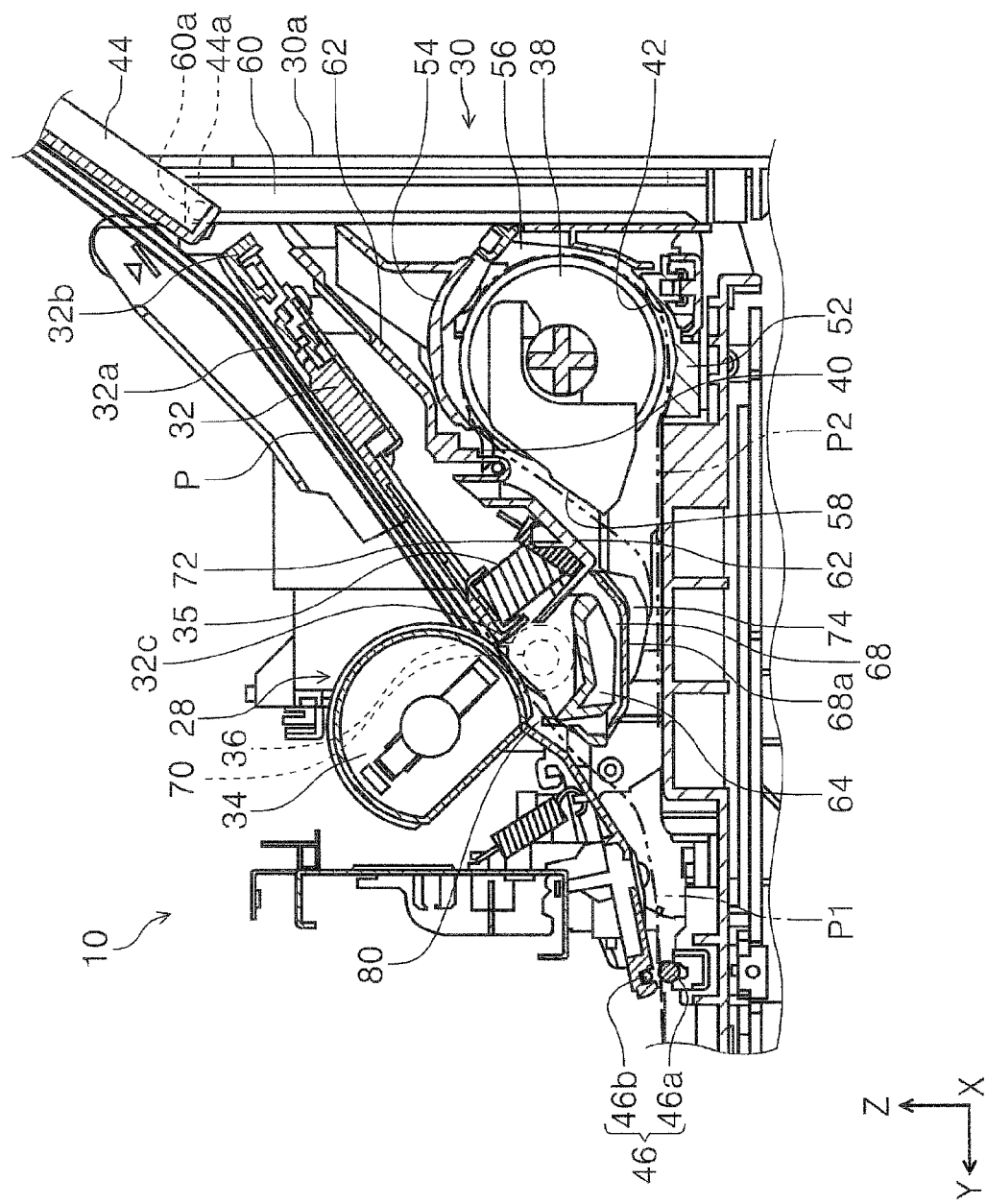
FIG. 14 is a cross-sectional view of a medium support section in a first state taken along the line XIV-XIV in FIG. 1.

FIG. 7 is a front view of the medium reversing unit. FIG. 8 is a perspective view illustrating a cover member in the rear feeding unit. FIG. 9 is a perspective view illustrating a relationship among a separation roller, medium return levers, and a cover member. FIG. 10 is a side view illustrating a relationship between a feed port cover that is provided on a rear side of the apparatus and a medium that is supported by a medium support section. FIG. 11 is a side view of the printer in which an auxiliary tray is stored and the feed port cover is closed. FIG. 12 is a schematic view illustrating a relationship between the medium support section and a driven roller. FIG. 13 is a schematic view illustrating a modification of the medium support section. FIG. 14 is a cross-sectional view of the medium support section in the first state taken along the line XIV-XIV in FIG. 1. FIGS. 15 to 18 are side cross-sectional views of the medium transport path between the medium reversing unit and the transport roller pair.

In an X-Y-Z coordinate system in each drawing, an X direction denotes a width direction of a recording medium, that is, an apparatus width direction, a Y direction denotes a recording medium transport direction in a transport path in the recording apparatus, that is, an apparatus depth direction, and a Z direction denotes an apparatus height direction.

First Embodiment

Outline of Printer

With reference to FIG. 1, an overall structure of a printer 10 is described. The printer 10 is an ink jet printer as an example recording apparatus. The printer 10 is a multifunction peripheral that includes an apparatus body 12 and a scanner unit 14.

In this embodiment, the scanner unit 14 is rotatably attached to a rear side end portion of the apparatus body 12 in the apparatus depth direction. Although not illustrated, the scanner unit 14 can be rotated to the apparatus rear side to expose an upper portion of the apparatus body 12. A cover 16 is attached to an upper portion of the scanner unit 14 such that the cover 16 can be rotated with respect to the scanner unit 14. The cover 16 can be rotated with respect to the scanner unit 14 to expose a document mounting surface (not illustrated) that is provided in the scanner unit 14 and set a document on the document mounting surface.

A feed port cover 18 is provided to a rear side end portion of the printer 10 in the apparatus depth direction such that the feed port cover 18 can be rotated with respect to the apparatus body 12. The feed port cover 18 can be closed (see FIG. 1 and FIG. 11) or opened (see FIG. 10). When the feed port cover 18 is open, a medium can be supplied into the apparatus body 12. When the feed port cover 18 is closed, the feed port cover 18 is flush with the cover 16 of the scanner unit 14. This structure provides the printer 10 with the flat top surface and provides an excellent design.

Hereinafter, a structure of the apparatus body 12 will be described. An operation panel 20 that can be rotated with respect to the apparatus body 12 is provided on a front side of the apparatus body 12 in the apparatus depth direction. The operation panel 20 has a display section such as a display panel and a plurality of buttons. The operation panel 20 can be switched between a closed state (see FIG. 1) in which the operation panel 20 is closed with respect to the apparatus body 12 and an open state (not illustrated) in which the operation panel 20 is open with respect to the apparatus body 12.

A discharge port 22 is provided below the operation panel 20 in the apparatus height direction on the front side of the apparatus body 12 in the apparatus depth direction. A carriage 24 (see chain double-dashed lines) is provided on the rear side of the operation panel 20 in the apparatus depth direction in the apparatus body 12. The carriage 24 can be reciprocated in the apparatus width direction in the apparatus body 12 by a driving section (not illustrated). A recording head 26, which is an example recording section for performing recording onto a medium, is provided in a lower section of the carriage 24.

A plurality of ink discharge nozzles (not illustrated) are formed on a lower surface of the recording head 26. A medium is transported in an area facing the recording head 26 below the recording head 26 and an ink is discharged from the ink discharge nozzles, and thereby recording is performed onto the medium.

Medium Transport Path

With reference to FIG. 2 and FIG. 14, a medium transport path will be described. On the rear side of the apparatus body 12 in the apparatus depth direction, a rear feeding unit 28 and a medium reversing unit 30 are provided. The rear feeding unit 28 includes a medium support section 32, a feeding roller 34, and a separation roller 36. The medium reversing unit 30 includes a reversing roller 38, a driven roller 40, an upstream roller 42 that is located on an upstream side of the driven roller 40 in a transport direction, and an auxiliary tray 44.

The medium support section 32 supports a medium P that is mounted on a support surface 32a in an inclined orientation. The medium support section 32 can be switched between a first state (see FIG. 14) in which the medium P that is supported in the inclined orientation is pressed against the feeding roller 34 and a second state (see FIG. 2) in which the supported medium P is separated from the feeding roller 34. More specifically, the medium support section 32 can serve, for example, as a hopper that has an end portion 32c on a downstream side in the transport direction and an end portion 32b on an upstream side in the transport direction in the medium support section 32. The end portion 32c can be turned with respect to the end portion 32b as a fulcrum. An urging member 35 (see also FIG. 6) that urges the medium support section 32 against the feeding roller 34 is provided in the end portion 32c of the medium support section 32 on the downstream side in the transport direction on the rear side of the medium support section 32. The urging member 35 is a coil spring, for example.

The auxiliary tray 44 can be switched between a storage state and a usage state, which will be described below. In the usage state, the support surface 32a can be extended so that the medium P can be supported in an inclined orientation. The feeding roller 34 can be driven and rotated by a driving force from a drive source (not illustrated) that is provided in the apparatus body 12. The separation roller 36 is located below the feeding roller 34 in the apparatus height direction.

When the medium support section 32 is in the first state as illustrated in FIG. 14, the medium P that is supported by the medium support section 32 is nipped by the feeding roller 34 and the separation roller 36 and transported toward a pair of transport rollers 46 that is an example of a "transport section" that is provided on the downstream side in the medium feeding direction. The transport roller pair 46 includes a transport driving roller 46a and a transport driven roller 46b. In this embodiment, the transport driving roller 46a is driven and rotated by a drive source (not illustrated). The transport driven roller 46b is rotated to follow the transport driving roller 46a. The transport driven roller 46b is provided in a roller support member 47. The roller support member 47 forms a transport path for a medium that is transported from the medium support section 32 to the transport roller pair 46.

The transport roller pair 46 transports the medium P to the area facing the recording head 26 on the downstream side in the feeding direction. Onto the medium P that has been transported to the area facing the recording head 26, recording is performed by the recording head 26 and the recorded medium P is discharged through a discharge port 22 to the apparatus front side. An alternate long and short dashed line shown by the reference character P1 in FIG. 2 and FIG. 14 shows a path of the medium P that is transported from the medium support section 32 toward the downstream side in the feeding direction in the apparatus body 12.

To perform two-sided printing on both sides of the medium P, the medium P is transported to the area facing the recording head 26 from the medium support section 32 to perform recording on a first side of the medium P. After the recording, the transport driving roller 46a is rotated reversely, and the recorded medium P is transported toward the medium reversing unit 30 from a trailing edge of the medium P.

As shown by a chain double-dashed line of the reference character P2, the medium P that has been transported to the medium reversing unit 30 is nipped and transported in sequence between the reversing roller 38 and the upstream roller 42 and then between the reversing roller 38 and the driven roller 40, which are disposed around the reversing roller 38. The medium P is reversed by the reversing roller 38 and transported toward the transport roller pair 46. In other words, the medium reversing unit 30 has a bending path that bends and reverses the medium P, and in this embodiment, the inner side of the bending path is formed by the reversing roller 38. It should be noted that instead of the reversing roller 38, the inner side of the bending path may be formed by a guide member. The medium P is transported to the area facing the recording head 26 by the transport roller pair 46 and recording is performed onto a second side (opposite side of the first side) of the medium P by the recording head 26. The recorded medium P is discharged through the discharge port 22 (see FIG. 1) to the apparatus front side in the apparatus depth direction. The chain double-dashed lines P2 in FIG. 2 and FIG. 14 show the path of the medium P that is transported along the reversing roller 38 in the medium reversing unit 30.

Structure of Medium Reversing Unit

A structure of the rear feeding unit 28 and the medium reversing unit 30 will be described in detail with reference to FIG. 3 through FIG. 11. First, a structure of the medium reversing unit 30 will be described. As illustrated in FIG. 4 and FIG. 6, the medium reversing unit 30 can be attached to or detached from the apparatus body 12. As illustrated in FIG. 4, the medium reversing unit 30 includes a rear side end section 30a and a reversing path section 30b. The rear side end section 30a of the medium reversing unit 30 is a part of the external appearance of the apparatus body 12 on the rear side in a state in which the medium reversing unit 30 is attached to the apparatus body 12 as illustrated in FIG. 3.

A pair of lock sections 48 is provided on the rear side end section 30a as illustrated in FIG. 4. The lock sections 48 can be switched between a locked state in which the medium reversing unit 30 that is attached to the apparatus body 12 is fixed to the apparatus body 12 and a unlocked state in which the medium reversing unit 30 that has been fixed to the apparatus body 12 is released. Each of the lock sections 48 has a lock releasing lever 48a. The lock releasing levers 48a are disposed to be exposed on the rear side of the rear side end section 30a in the apparatus depth direction as illustrated in FIG. 3.

In this embodiment, in a state in which the medium reversing unit 30 is attached to the apparatus body 12, a pair of lock releasing levers 48a is pressed toward each other, that is, toward central directions in the apparatus width direction to release the locked state of the lock sections 48 with respect to the apparatus body 12, that is, the locked state of the medium reversing unit 30 is released, and the medium reversing unit 30 can be detached from the apparatus body 12.

The reversing path section 30b (see FIG. 4 and FIG. 6) is provided on the front side of the rear side end section 30a of the medium reversing unit 30 in the apparatus depth direction. As illustrated in FIG. 6, the reversing path section 30b includes the reversing roller 38. The reversing roller 38 is disposed at a central portion of the reversing path section 30b in the apparatus width direction as illustrated in FIG. 7. A drive gear 50 (see FIG. 4, FIG. 5, and FIG. 7) is rotatably attached to a right end portion of the reversing path section 30b in the apparatus width direction. To the drive gear 50, a drive shaft (not illustrated) that extends in the left direction in the apparatus width direction is provided. The reversing roller 38 is attached to the left end portion of the drive shaft (not illustrated) in the apparatus width direction. The medium reversing unit 30 is attached to the apparatus body 12, and a drive unit that is provided in the apparatus body 12 drives and rotates the drive gear 50 to drive and rotate the reversing roller 38.

In the reversing path section 30b below the reversing roller 38, a lower path forming member 52 is provided so as to face the reversing roller 38 as illustrated in FIG. 2 and FIG. 6. Above the reversing roller 38, an upper path forming member 54 is provided so as to face the reversing roller 38.

The lower path forming member 52 and the upper path forming member 54 cover around the reversing roller 38, forming a medium transport path 56 (see FIG. 2 and FIG. 6) in the reversing path section 30b, that is, a part of the transport path around the reversing roller 38 in the reversing path. The upstream roller 42 is rotatably attached to the lower path forming member 52. The upstream roller 42 can be driven and rotated by the reversing roller 38 to follow the reversing roller 38. As illustrated in FIG. 2, the upstream roller 42 is attached to the lower path forming member 52 so as to be located within an occupied area of the reversing roller 38 in the apparatus depth direction, that is, so as to be located below the reversing roller 38 in the apparatus height direction.

On the front side of the reversing path section 30b in the apparatus depth direction, an inclined surface 58 (see FIG. 4 and FIG. 6) that extends downward in the apparatus height direction and toward the front side in the apparatus depth direction is provided. As illustrated in FIG. 2, the inclined surface 58 is a part of a medium transport path 56 when the medium reversing unit 30 is attached to the apparatus body 12.

An auxiliary tray 44 (see FIG. 3 and FIG. 7) is provided on the rear side end section 30a of the medium reversing unit 30. The auxiliary tray 44 can be switched between a storage state in which the auxiliary tray 44 is stored on the front side of the rear side end section 30a in the apparatus depth direction as illustrated in FIG. 5 and FIG. 7 and a usage state in which the auxiliary tray 44 is pulled upward from the stored state in the apparatus height direction and inclined toward the rear surface side in the apparatus depth direction as illustrated in FIG. 3 and FIG. 4. While the medium reversing unit 30 is attached to the apparatus body 12, the auxiliary tray 44 that is in the usage state is positioned so as to support the medium P in an inclined orientation on the upstream side of the support surface 32a of the medium support section 32 in the feeding direction as illustrated in FIG. 2. With this structure, the auxiliary tray 44 can support the medium P together with the support surface 32a in the feeding direction of the medium P, and this structure enables a medium that is longer than the length of the support surface 32a of the medium support section 32 to be set on the medium support section 32.

As illustrated in FIG. 2 and FIG. 4, grooves 60 that extend in the apparatus height direction are provided on the front side of the rear side end section 30a in the apparatus depth direction. The grooves 60 are disposed to face each other with a distance in the apparatus width direction. A holding section 60a (see FIG. 2) is provided at an upper end of each groove 60. A rotating shaft 44a (see FIG. 2 and FIG. 7) is provided in a lower end section of the auxiliary tray 44. The rotating shaft 44a of the auxiliary tray 44 can be moved in the grooves 60.

The rotating shaft 44a of the auxiliary tray 44 is engaged with the holding sections 60a in the usage state (see FIG. 2) in which the auxiliary tray 44 is inclined toward the rear side of the rear side end section 30a in the apparatus depth direction. This structure maintains the inclined orientation of the auxiliary tray 44 with the holding sections 60a. When the auxiliary tray 44 is rotated from the state (usage state) in which the auxiliary tray 44 is inclined to the front side in the apparatus depth direction, the engaged rotating shaft 44a of the auxiliary tray 44 and the holding sections 60a are released, and the rotating shaft 44a can be moved downward along the grooves 60, and thereby the auxiliary tray 44 is stored in the rear side end section 30a as illustrated in FIG. 5 and FIG. 7.

Structure of Rear Feeding Unit

With reference to FIG. 2, FIG. 6, FIG. 8, and FIG. 9, a structure of the rear feeding unit 28 will be described. The rear feeding unit 28 is disposed on the rear side of the apparatus body 12 in the apparatus depth direction as illustrated in FIG. 2. The medium support section 32 is disposed on the rear side of the apparatus body 12 in an inclined state. In FIG. 2, a reference character Y1 shows a position of a rear end portion of the medium support section 32 in the apparatus depth direction, and a reference character Y2 shows a position of a front end portion of the medium support section 32.

The rear feeding unit 28 includes a support frame 62 as illustrated in FIG. 2. The support frame 62 is disposed on the rear side end section of the apparatus body 12, extends in the apparatus depth direction, and is inclined downward from the rear side toward the front side in the apparatus depth direction. The medium support section 32 is attached to an upper section of the support frame 62 and is supported by the support frame 62. In the support frame 62, to the side opposite to the side the medium support section 32 is attached, that is, to the rear side, the driven roller 40 is rotatably attached.

On the rear side of the support frame 62, a portion closer to the front side than the driven roller 40 in the apparatus depth direction is a path forming section 62a, which is a part of the medium transport path 56 that serves as the reversing path. The path forming section 62a, for example, faces the reversing roller 38 and the inclined surface 58 of the reversing path section 30b to form the medium transport path 56 together with the reversing roller 38 and the inclined surface 58.

With reference to FIG. 12, a roller accommodating space 63 will be described. As illustrated in FIG. 12, the medium support section 32 is shaped such that the rear side of the medium support section 32, that is, a part of the lower side of the medium support section 32, is cut away along the medium transport direction to provide a space for accommodating another component. In this embodiment, the space corresponds to the roller accommodating space 63. When the medium support section 32 is in the second state, at least a part of the driven roller 40 is placed in the roller accommodating space 63 in the apparatus height direction. With this structure, the rear feeding unit 28 and the medium reversing unit 30 can be closely placed in the apparatus height direction and thereby the size-reduced apparatus can be provided. Note that the arrow d in FIG. 12 indicates a thickness direction of the medium support section 32.

The reversing path section 30b, that is, the reversing roller 38 and the upstream roller 42, is disposed in the area between the position Y1, which is the position of the rear end portion of the medium support section 32, and the position Y2, which is the position of the front end portion, that is, within the occupied area of the medium support section 32. When the medium reversing unit 30 is attached to the apparatus body 12, the reversing path section 30b is located on the rear side of the medium support section 32, that is, below the support frame 62.

The driven roller 40, which comes into contact with the reversing roller 38 to nip the medium P therebetween, is also disposed within the occupied area of the medium support section 32. The reversing roller 38 and the driven roller 40 are disposed on the side closer to the front side in the apparatus depth direction with respect to the stored auxiliary tray 44 (see FIG. 5 and FIG. 7), that is, the auxiliary tray 44 that is stored in the rear side end section 30a. As illustrated in FIG. 2, the reversing roller 38 and the driven roller 40 are disposed on the side closer to the rear side than the position Y2, which is the position of the front end portion of the medium support section 32, in the apparatus depth direction. In other words, the reversing roller 38 and the driven roller 40 are disposed between the auxiliary tray 44 that is stored in the rear side end section 30a and the medium support section 32 in the apparatus depth direction. Furthermore, the reversing roller 38 and the driven roller 40 overlap at least a part of the medium support section 32 in the apparatus height direction as illustrated in FIG. 2.

In the support frame 62, on the side closer to the downstream side than the medium support section 32 in the medium transport direction, the separation roller 36, medium return levers 64 (FIG. 9) that serve as a "return member", a cover member 66 (FIG. 9), and a roller support member 68 are provided.

In FIG. 9, the roller support member 68 rotatably supports the separation roller 36 via a torque limiter 70. The torque limiter 70 that is provided through the separation roller 36 applies a predetermined level of rotation resistance to the separation roller 36. When the rotational torque from the feeding roller 34 exceeds a limit torque of the torque limiter 70, the separation roller 36 is driven and rotated by the feeding roller 34 (in the counterclockwise direction in FIG. 2).

An urging member 72 is attached to the roller support member 68 as illustrated in FIG. 9. In this embodiment, the urging member 72 is a coil spring, for example. Specifically, one end portion of the urging member 72 is attached to the roller support member 68. The other end portion of the urging member 72 is attached to the support frame 62 (see FIG. 2). The urging force of the urging member 72 acts on the separation roller 36 that is attached to the roller support member 68 to urge the separation roller 36 against the feeding roller 34.

A lower surface 68a of the roller support member 68 covers a placement area of the separation roller 36 and a part of a rotating shaft 76, which will be described below, and forms a part of the medium transport path 56, that is, the reversing path for the medium P as illustrated in FIG. 2 and FIG. 6. On the lower surface 68a of the roller support member 68, a plurality of ribs 74 that protrude downward from the lower surface 68a in the apparatus height direction and extend along the medium transport path 56 are provided (FIG. 8). The ribs 74 are provided at appropriate intervals in the apparatus width direction, that is, in the width direction of the medium P. The ribs 74 guide the medium P that is transported on the medium transport path 56.

In FIG. 9, the medium return levers 64 are provided at appropriate intervals in the rotating shaft 76 that extends in the apparatus width direction. In this embodiment, as an example, a pair of medium return levers 64 is provided. The separation roller 36 is provided between the medium return lever pair 64 in the apparatus width direction.

A drive lever 78 is provided at one end portion of the rotating shaft 76. The rotating shaft 76 is rotatably attached to the apparatus body 12. When the drive lever 78 is rotated around the rotating shaft 76 by a drive unit (not illustrated) that is provided in the apparatus body 12, the rotating shaft 76 is also rotated. In response to the rotation of the rotating shaft 76, the medium return levers 64 are also rotated around the rotating shaft 76.

The medium return levers 64 can be switched in response to the rotation of the rotating shaft 76 between a position at which the medium return levers 64 protrude in a medium transport path 80 for transporting the medium P from the medium support section 32 as illustrated in FIG. 6 and a position (not illustrated) at which the medium return levers 64 are retracted from the medium transport path 80. In FIG. 2 and FIG. 14, when the medium P is transported from the medium support section 32 toward the downstream side in the feeding direction, the medium support section 32 is switched from the second state to the first state to swing in the direction coming into contact with the feeding roller 34. The feeding roller 34 comes into contact with the uppermost medium P that is mounted on the medium support section 32 and feeds the uppermost medium P to the feeding path downstream side. The next and subsequent media P are separated from the uppermost medium P by the separation roller 36 and the medium return levers 64 protrude in the medium transport path 80. By the protruding medium return levers 64, the next and subsequent media P are returned to the medium support section 32 and thereby the next and subsequent media P are prevented from being unnecessarily fed toward the downstream side of the medium transport path 80. The medium transport path 80 is a path from the medium support section 32 through the feeding roller 34, the separation roller 36, and the transport roller pair 46 to the recording head 26.

The cover member 66 is disposed below the rotating shaft 76 as illustrated in FIG. 9 to cover a part of the area where the medium return lever 64 is disposed and the rotating shaft 76. The cover member 66 is disposed adjacent to the roller support member 68 in the apparatus width direction. A lower surface 66a of the cover member 66 forms a part of the medium transport path 56, that is, the reversing path for the medium P. On the lower surface 66a of the cover member 66, a plurality of ribs 82 that protrude downward from the lower surface 66a in the apparatus height direction and extend along the medium transport path 56 are provided. The ribs 82 are provided at appropriate intervals in the apparatus width direction, that is, in the width direction of the medium P. The ribs 82 guide the medium P that is transported on the medium transport path 56.

Figure 15:
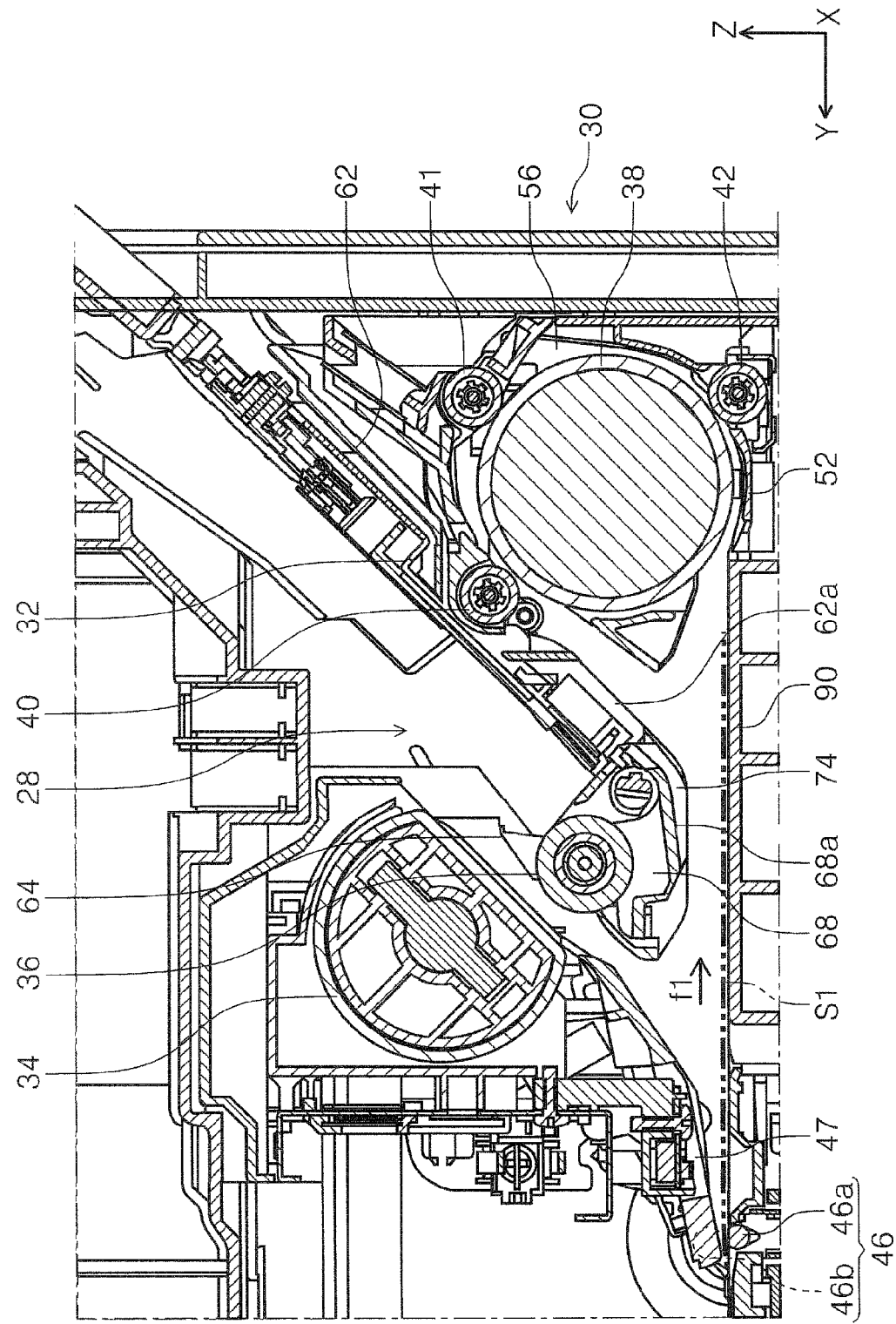
FIG. 15 is a side cross-sectional view of a medium transport path between a medium reversing unit and a transport roller pair.

With reference to FIG. 15 to FIG. 18, the path through which a medium that is fed from the rear feeding unit 28 passes in two-sided printing will be further described. To perform printing on both sides of a medium, recording is performed onto a medium that is fed from the medium support section 32, which is a part of the rear feeding unit 28, and the recorded medium is transported by the transport roller pair 46 to the medium reversing unit 30 in a direction (a direction indicated by an arrow f1 in FIG. 15) opposite to the transport direction in the recording. In FIG. 15, a reference character S1 shows an example medium that is transported toward the reversing roller 38 (the bending path around the reversing roller 38) of the medium reversing unit 30. A reference numeral 90 denotes a path forming member that forms a lower side of a transport path for a medium that is transported from the transport roller pair 46 toward the reversing roller 38.

Figure 16:
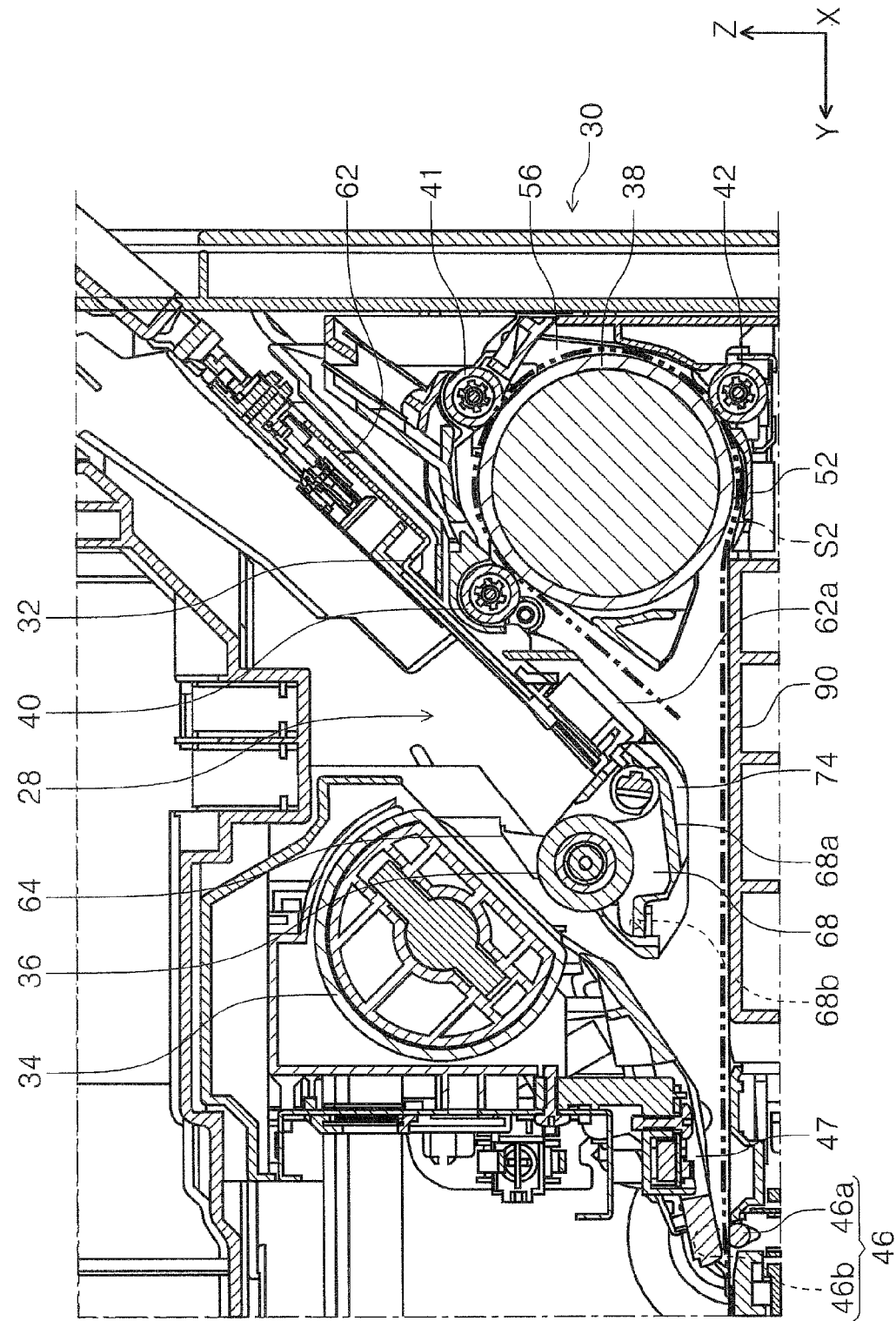
FIG. 16 is a side cross-sectional view of a medium transport path between a medium reversing unit and a transport roller pair.

The medium is bent and reversed by the reversing roller 38 and transported from the nip position between the reversing roller 38 and the driven roller 40 toward the downstream side as illustrated in FIG. 16. In FIG. 16, a reference character S2 shows an example medium whose leading edge has passed through the nip position between the reversing roller 38 and the driven roller 40 and is transported toward the downstream side. A reference numeral 41 denotes a driven roller that is omitted in FIG. 2, FIG. 6, and FIG. 14, and is provided on the upstream side of the driven roller 40. The driven roller 41 is disposed within the occupied area of the reversing roller 38 in the apparatus depth direction (Y direction), similarly to the upstream roller 42, and thereby the length in the apparatus depth direction is reduced.

As clearly understood from FIG. 15 and FIG. 16, the medium, which has been reversed by the medium reversing unit 30, passes through a part of the rear side of the rear feeding unit 28, specifically, the path formed by the path forming section 62a, which is a part of the rear surface of the support frame 62, and is transported toward the transport roller pair 46. In other words, the rear feeding unit 28 itself forms the transport path for a medium that has been reversed by the medium reversing unit 30 and transported toward the transport roller pair 46, reducing the number of components and reducing the size of the apparatus in the structure in which the rear feeding unit 28 and the medium reversing unit 30 are provided.

As clearly understood from FIG. 15 and FIG. 16, the medium, which has been recorded by the recording head 26 and is transported in the direction (the arrow f1 direction in FIG. 15) opposite to the transport direction in the recording, passes below the roller support member 68, enters the medium reversing unit 30, and is transported again below the roller support member 68 toward the transport roller pair 46. In other words, the rear feeding unit 28 itself forms the transport path for a medium that is transported from the transport roller pair 46 toward the medium reversing unit 30, and also forms the transport path for a medium that has been reversed by the medium reversing unit 30 and is transported to the transport roller pair 46. Consequently, the number of components can be reduced and the size of the apparatus can be reduced in the structure in which the rear feeding unit 28 and the medium reversing unit 30 are provided.

Figure 17:
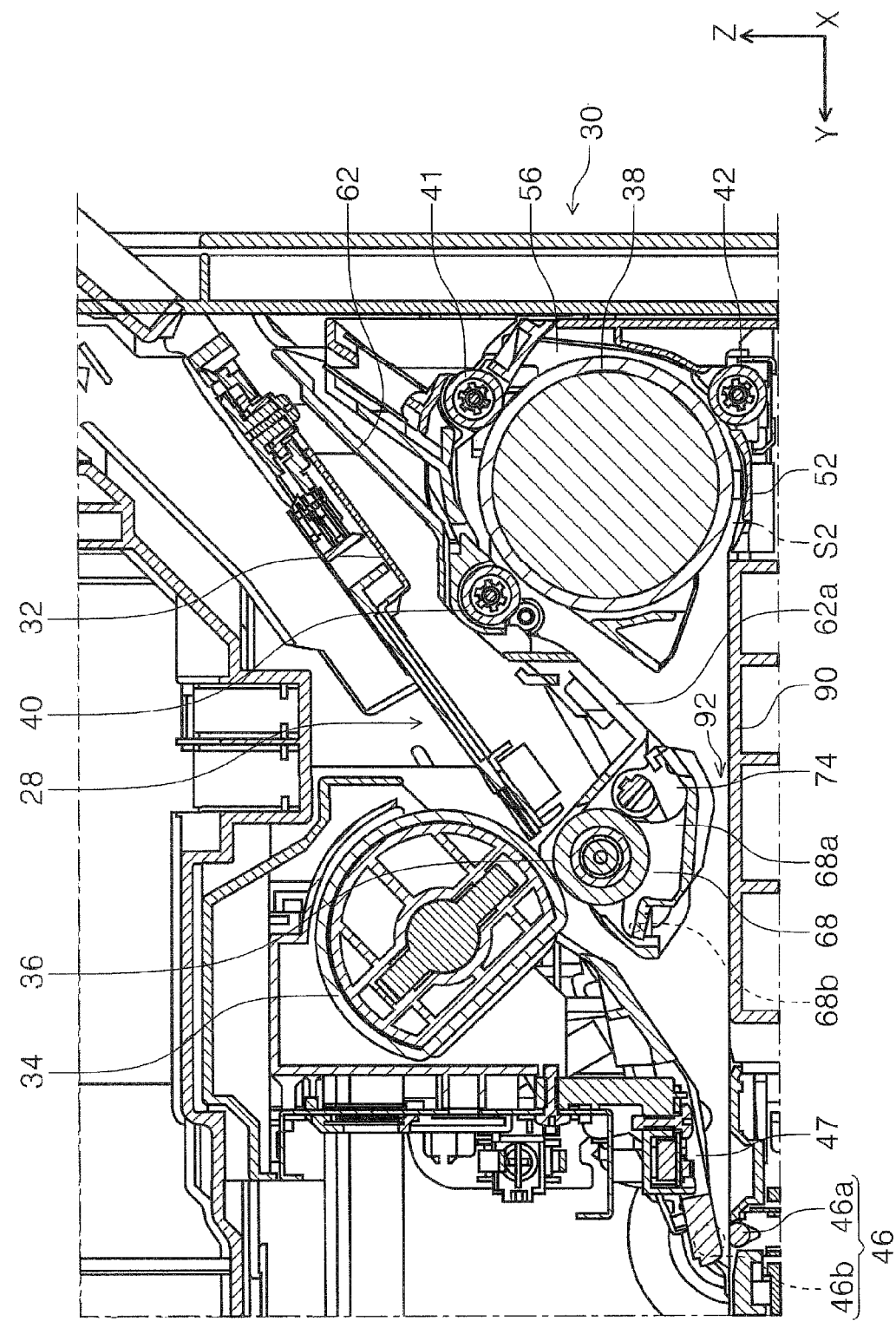
FIG. 17 is a side cross-sectional view of a medium transport path between a medium reversing unit and a transport roller pair.

A space (a reference numeral 92 in FIG. 17) between the roller support member 68 and the path forming member 90 is narrowed by the rotation (feeding of a medium from the rear feeding unit 28) of the feeding roller 34 as illustrated in FIG. 17. In other words, the roller support member 68 can swing about a pivot shaft 68b and the separation roller 36 is urged by the urging member 72 (FIG. 2) against the feeding roller 34. In a no-feeding state, a flat portion of the feeding roller 34 faces the separation roller 36 as illustrated in FIG. 15 and the roller support member 68 is placed at a lifted position, thereby the space (the width of the transport path) between the roller support member 68 and the path forming member 90 is widened.

When the feeding roller 34 is rotated from this state and feeding of a medium is started, an arc portion of the feeding roller 34 presses down the separation roller 36 as illustrated in FIG. 17 to cause the roller support member 68 to be placed at a lowered position, thereby the space (the width of the transport path) between the roller support member 68 and the path forming member 90 is narrowed. In this state, since the medium is being fed from the rear feeding unit 28, no medium is transported from the transport roller pair 46 to the medium reversing unit 30.

Figure 18:
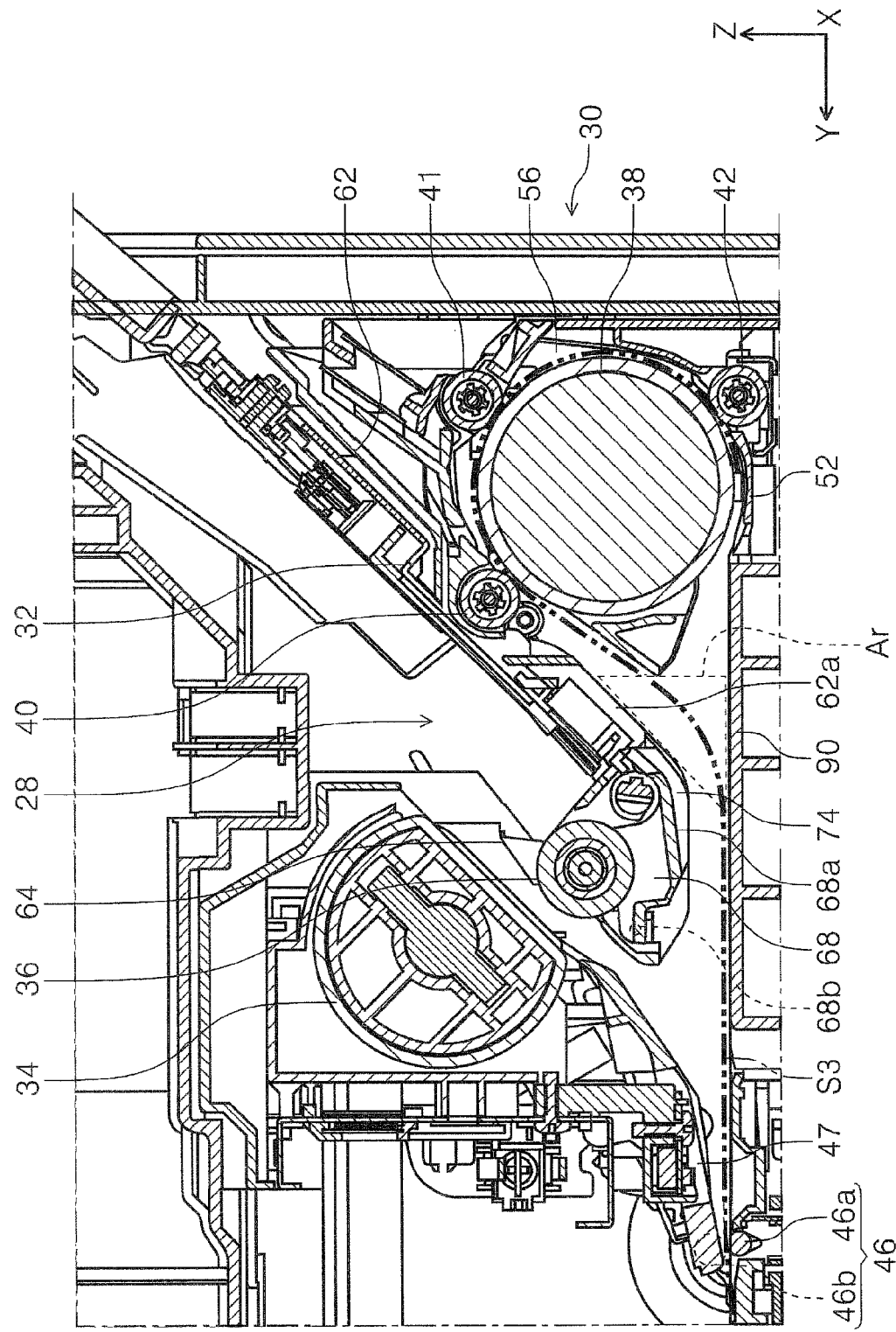
FIG. 18 is a side cross-sectional view of a medium transport path between a medium reversing unit and a transport roller pair.

A space Ar in which a bend can be formed as illustrated in FIG. 18 is provided in the medium transport path between the nip position between the reversing roller 38 and the driven roller 40, that is, the exit of the curved path around the reversing roller 38, and the lower side of the roller support member 68. The space Ar is used to correct a skewed medium. To perform skew correction on a medium (a reference character S3 in FIG. 18) that is transferred from the reversing roller 38 to the transport roller pair 46, the reversing roller 38 is rotated to cause the medium to hit its leading edge against the transport roller pair 46 that has been stopped. In this operation, the medium is bent between the transport roller pair 46 and the reversing roller 38 to fit along the nip of the transport roller pair 46. The space Ar, which is provided on the medium transport path between the exit of the curved path of the medium reversing unit 30 and the lower side of the roller support member 68, enables the medium to be appropriately bent for skew correction on the upstream side of the transport roller pair 46, enabling appropriate skew correction. In this embodiment, which has been described with reference to FIGS. 15 to 18, the medium support section 32 is not necessarily configured to be able to move upward and downward; alternatively, for example, the medium support section 32 may be fixed. Specifically, for example, the medium support section 32 may be a manual feed tray.

With reference to FIG. 10, the feed port cover 18 will be described. In this embodiment, the feed port cover 18 can rotate with respect to the apparatus body 12 about a front side end portion in the apparatus depth direction as a rotating shaft. To a free end of the feed port cover 18, that is, to a lower side of a rear side end section 18a in the apparatus depth direction, a roller 84 is rotatably attached. As illustrated in FIG. 10, when the feed port cover 18 is placed to be closed in a state in which a plurality of media P that are mounted on the medium support section 32 and the auxiliary tray 44 are supported by the medium support section 32 and the auxiliary tray 44 in an inclined orientation, the roller 84 comes into contact with the uppermost medium P of the media P.

When feeding is started, from the media P that are supported by the medium support section 32 and the auxiliary tray 44, the media P are fed from the uppermost medium P to the downstream side in the feeding direction. The roller 84 rotates in accordance with the movement of the medium P while the uppermost medium P is nipped between the feeding roller 34 and the separation roller 36 and introduced into the apparatus body 12. With this rotation, the transport load in feeding the uppermost medium P is reduced and damages to the uppermost medium P during feeding of the uppermost medium P can be reduced.

When the feed port cover 18 is closed with respect to the apparatus body 12 as illustrated in FIG. 11, the roller 84 is stored in the apparatus body 12. In this structure, for example, if the roller 84 is not provided on the feed port cover 18, the feed port cover 18 comes into contact with the medium P that is supported by the medium support section 32 and the auxiliary tray 44 and increases the transport load. In such a case, the medium P may be damaged. To solve the problem, if ribs for supporting the feed port cover 18 are provided on the auxiliary tray 44 to prevent the medium P that is supported by the medium support section 32 from coming into contact with the feed port cover 18, it is necessary to widen the space for storing the auxiliary tray 44 in accordance with the height of the ribs to store the auxiliary tray 44 in the apparatus body 12. The increase in the size of the storage space increases the size of the printer 10. In this embodiment, however, the roller 84 is provided to the feed port cover 18, and this structure reduces the space for storing the auxiliary tray 44 and reduces the size of the apparatus.

Furthermore, the auxiliary tray 44 is completely stored in the apparatus body 12 when the auxiliary tray 44 is switched from the usage state to the storage state. As a result, as illustrated in FIG. 11, the upper surface and the rear surface of the printer 10 become flat and the printer 10 has an excellent design.

Modifications of the Embodiment

In this embodiment, as illustrated in FIG. 12, the roller accommodating space 63 is shaped such that the rear side of the medium support section 32 in the standby state, which is a part of the lower side of the medium support section 32, is cut away along the medium transport direction. Alternatively, as illustrated in FIG. 13, a recessed portion that can accommodate at least a part of the driven roller 40 may be provided on the rear side of the medium support section 86 in the standby state and the recessed portion may be used as a roller accommodating space 88. Note that the arrow d in FIG. 13 indicates a thickness direction of the medium support section 86. A reference numeral 86a denotes a support surface of the medium support section 86.

In summary, a printer includes the feeding roller 34 configured to feed a medium P, the rear feeding unit 28 including the medium support section 32 configured to support the medium P in an inclined orientation and to be switched between the first state in which the supported medium P is pressed against the feeding roller 34 and the second state in which the supported medium P is separated from the feeding roller 34, the rear feeding unit 28 being provided on the rear side of the apparatus, and the medium reversing unit 30 provided below the medium support section 32, the medium reversing unit 30 including the reversing roller 38 configured to reverse the medium p. At least a part of the rear side of the rear feeding unit 28 forms the medium transport path 56 around the reversing roller 38. The rear feeding unit 28 includes the driven roller 40 configured to nip the medium P with the reversing roller 38 therebetween. At least a part of the driven roller 40 is located in the roller accommodating spaces 63 or 88 formed on the rear side of the medium support section 32 when the medium support section 32 is in the second state.

With this structure, the rear feeding unit 28 includes the driven roller 40 configured to nip the medium P with the reversing roller 38 therebetween. At least a part of the driven roller 40 is located in the roller accommodating spaces 63 or 88 formed on the rear side of the medium support section 32 when the medium support section 32 is in the second state. Consequently, the rear feeding unit 28 and the medium reversing unit 30 can be closely disposed and thereby the size-reduced apparatus can be provided.

The reversing roller 38 and the driven roller 40 are located within the occupied area of the medium support section 32 in the apparatus depth direction. With this structure, the size of the apparatus in the depth direction can be reduced.

The reversing roller 38 and the driven roller 40 overlap at least a part of the medium support section 32 in the apparatus height direction. With this structure, the size of the apparatus in the height direction can be reduced.

The printer includes the auxiliary tray 44 configured to support together with the medium support section 32 the medium P that is set on the rear feeding unit 28. The auxiliary tray 44 can be switched between the storage state in which the auxiliary tray 44 is stored on the rear side of the apparatus and the usage state in which the auxiliary tray 44 is pulled upward from the storage state to extend the support surface 32a of the medium support section 32 to support the medium P. The reversing roller 38 and the driven roller 40 are located between the auxiliary tray 44 that is in the storage state and the medium support section 32 in the apparatus depth direction. With this structure, the reversing roller 38 and the driven roller 40 can be located using the space between the medium support section 32 and the auxiliary tray 44, and thereby the size-reduced apparatus can be provided.

The printer includes the upstream roller 42 configured to nip the medium P with the reversing roller 38 therebetween, the upstream roller 42 being located on the upstream side of the driven roller 40 in the medium transport path 56 around the reversing roller 38. The upstream roller 42 is located within the occupied area of the reversing roller 38 in the apparatus depth direction. With this structure in which the upstream roller 42 is provided, the size of the apparatus in the depth direction can be reduced.

The rear feeding unit 28 includes the separation roller 36 configured to nip and separate the medium P with the feeding roller 34 therebetween, the medium return levers 64 configured to return the medium P separated by the feeding roller 34 and the separation roller 36, and the cover member 66 located between the area where the medium return lever is located and the medium transport path 56 on the downstream side of the reversing roller 38, the cover member being configured to form the medium transport path on the downstream side of the reversing roller 38. With this structure, the cover member 66 that covers the placement area of the medium return lever 64 forms the medium transport path 56 on the downstream side of the reversing roller 38, and thereby the number of components can be reduced and the costs can be reduced.

The rear feeding unit 28 includes the roller support member 68 configured to support the separation roller 36. The roller support member 68 is located between the area where the separation roller 36 is located and the medium transport path 56 on the downstream side of the reversing roller 38, and the roller support member 68 is configured to cover the area where the separation roller 36 is located and form the medium transport path on the downstream side of the reversing roller 38. With this structure, the roller support member 68 that supports the separation roller 36 forms the medium transport path 56 on the downstream side of the reversing roller 38, and thereby the number of components can be reduced and the costs can be reduced.

The medium reversing unit 30 can be attached to or detached from the apparatus body 12. With this structure, when a paper jam occurs, the operation for removing the jam can be readily performed.

In the embodiments, the rear feeding unit 28 and the medium reversing unit 30 are used in the ink jet printer that is an example recording apparatus of the invention; alternatively, the invention may be applied to other liquid ejecting apparatuses. Such liquid ejecting apparatuses include printers that use an ink-jet recording head to discharge ink from the recording head to perform recording onto a recording medium and recording apparatuses such as copying machines and facsimile machines, and further include apparatuses that eject liquid that corresponds to the use of the ink from a liquid ejecting head that corresponds to the ink-jet recording head onto a recording medium to apply the liquid to the recording medium.

The liquid ejecting head may be, in addition to the above-described recording head, a color material ejecting head that is used to manufacture a color filter for a liquid crystal display or the like, an electrode material (conductive paste) ejecting head that is used to manufacture an electrode for an organic electroluminescence (EL) display, a field emission display (FED) or the like, a bioorganic compound ejecting head that is used to manufacture a biochip, or a sample ejecting head that is used as a precision pipette.

It is to be understood that the present invention is not limited to the above-described embodiment, various modifications can be made within the scope of the following claims, and these modifications are included within the scope of the invention.

The entire disclosure of Japanese Patent Applications No. 2017-032257, filed Feb. 23, 2017 and 2017-153363, filed Aug. 8, 2017 is expressly incorporated by reference herein.

What is claimed is:

1. A recording apparatus comprising:
a feeding roller configured to feed a medium;
a rear feeding unit including a medium support section configured to support the medium in an inclined orientation and to be switched between a first state in which the supported medium is pressed against the feeding roller and a second state in which the supported medium is separated from the feeding roller, the rear feeding unit being provided on a rear side of the apparatus; and
a medium reversing unit provided below the medium support section, the medium reversing unit including a reversing roller configured to reverse the medium,
wherein at least a part of a rear side of the rear feeding unit forms a medium transport path in which the medium is transported by the reversing roller,
the rear feeding unit includes a driven roller configured to nip the medium with the reversing roller therebetween, and
at least a part of the driven roller is located in a roller accommodating space formed in the medium support section when the medium support section is in the second state.

2. The recording apparatus according to claim 1, wherein the reversing roller and the driven roller are located within an occupied area of the medium support section in the apparatus depth direction.

3. The recording apparatus according to claim 1, wherein the reversing roller and the driven roller overlap at least a part of the medium support section in the apparatus height direction.

4. The recording apparatus according to claim 1, further comprising: an auxiliary tray configured to support together with the medium support section a medium that is set on the rear feeding unit,
wherein the auxiliary tray can be switched between a storage state in which the auxiliary tray is stored on the rear side of the apparatus and a usage state in which the auxiliary tray is pulled upward from the storage state to extend a support surface of the medium support section to support the medium, and
the reversing roller and the driven roller are located between the auxiliary tray that is in the storage state and the medium support section in the apparatus depth direction.

5. The recording apparatus according to claim 4, further comprising: an upstream roller configured to nip the medium with the reversing roller therebetween, the upstream roller being located on the upstream side of the driven roller in the medium transport path in which the medium is transported by the reversing roller,
wherein the upstream roller is located within an occupied area of the reversing roller in the apparatus depth direction.

6. The recording apparatus according to claim 1, wherein the rear feeding unit includes a separation roller configured to nip and separate the medium with the feeding roller therebetween;
a medium return member configured to return the medium separated by the feeding roller and the separation roller; and
a cover member located between an area where the medium return member is located and a medium transport path on a downstream side of the reversing roller, the cover member being configured to form the medium transport path on the downstream side of the reversing roller.

7. The recording apparatus according to claim 6, wherein the rear feeding unit includes a roller support member configured to support the separation roller,
wherein the roller support member is located between an area where the separation roller is located and the medium transport path on the downstream side of the reversing roller, and the roller support member is configured to cover the area where the separation roller is located and form the medium transport path on the downstream side of the reversing roller.

8. The recording apparatus according to claim 7, further comprising:
a recording section configured to perform recording onto the medium; and
a transport section configured to transport the medium toward the recording section,
wherein in performing printing on both sides of the medium, recording is performed on the medium that is fed from the medium support section by the recording section, the recorded medium is transported in a direction opposite to the transport direction in the recording and enters the medium reversing unit, and the recorded medium is transported in the transport path formed by a part of the rear side of the rear feeding unit to the transport section.

9. The recording apparatus according to claim 8, wherein in the recording apparatus, the medium on which recording has been performed by the recording section is transported below the roller support member in the direction opposite to the transport direction in printing and enters the medium reversing unit, and is transported again below the roller support member to the transport section.

10. The recording apparatus according to claim 1, wherein the medium reversing unit is detachably attached to the apparatus body.

11. The recording apparatus according to claim 1,
wherein at least the part of the driven roller overlaps the medium support section in the direction in which the media is placed on the inclined medium support section.

12. A recording apparatus comprising:
a recording section configured to perform recording on a medium;
a transport section configured to transport the medium toward the recording section;

a feeding roller configured to feed the medium toward the transport section;

a rear feeding unit including a medium support section configured to support the medium fed by the feeding roller in an inclined orientation, the rear feeding unit being provided on a rear side of the apparatus; and a medium reversing unit provided below the medium support section and includes a medium reversing unit including a curved path configured to bend and reverse the medium, wherein in performing printing on both sides of the medium, recording is performed on the medium that is fed from the medium support section by the recording section, the recorded medium is transported in a direction opposite to the transport direction in the recording and enters the curved path, and the recorded medium is transported in the transport path formed by a part of the rear side of the rear feeding unit to the transport section, and wherein the medium reversing unit is detachably attached to the apparatus body, and when the medium reversing unit is in a drawn-out state, the transport path is opened.

13. A recording apparatus comprising:

a recording section configured to perform recording on a medium;

a transport section configured to transport the medium toward the recording section;

a feeding roller configured to feed the medium toward the transport section;

a rear feeding unit including a medium support section configured to support the medium fed by the feeding roller in an inclined orientation, the rear feeding unit being provided on a rear side of the apparatus; and a medium reversing unit provided below the medium support section and includes a medium reversing unit including a curved path configured to bend and reverse the medium, wherein the rear feeding unit includes a separation roller configured to nip and separate the medium with the feeding roller therebetween; and a roller support member configured to support the separation roller, and in performing printing on both sides of the medium, recording is performed on the medium that is fed from the medium support section by the recording section, the recorded medium is transported below the roller support member in a direction opposite to the transport direction in the recording and enters the curved path, and the recorded medium is transported again below the roller support section to the transport section.

14. The recording apparatus according to claim 13, wherein a space in which the medium can be bent is provided on the medium transport path between an exit of the curved path and the lower side of the roller support member.

* * * * *